(12) United States Patent
Fimoff et al.

(10) Patent No.: US 6,510,178 B1
(45) Date of Patent: Jan. 21, 2003

(54) COMPENSATING FOR DRIFT IN THE DOWN CONVERSION OF HIGH DEFINITION SEQUENCES TO LOWER RESOLUTION SEQUENCES

(75) Inventors: Mark Fimoff, Hoffman Estates, IL (US); Jin H. Kim, Glenview, IL (US); Scott M. LoPresto, Mount Prospect, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/464,279

(22) Filed: Dec. 15, 1999

(51) Int. Cl.[7] .................................................. H04N 7/18
(52) U.S. Cl. .............................. 375/240.17; 375/240.21
(58) Field of Search ....................... 375/240.1–240.29

(56) References Cited

U.S. PATENT DOCUMENTS

| | | | | |
|---|---|---|---|---|
| 6,075,906 A | * | 6/2000 | Fenwick et al. ............ | 348/581 |
| 6,148,033 A | * | 11/2000 | Pearlstein et al. ...... | 375/240.16 |
| 6,243,421 B1 | * | 6/2001 | Nakajima et al. ....... | 375/240.21 |
| 6,249,549 B1 | * | 6/2001 | Kim ........................ | 375/240.21 |
| 6,262,770 B1 | * | 7/2001 | Boyce et al. ................ | 257/295 |
| 6,310,919 B1 | * | 10/2001 | Florencio ................ | 375/240.16 |

* cited by examiner

Primary Examiner—Andy Rao

(57) ABSTRACT

In a reduced memory MPEG decoder, drift caused by the application of ½ pixel resolution motion vectors during prediction filtering is reduced. Received P and B frame and field DCT coded blocks are down converted. Reference pixels are selected based upon a received motion vector. The selected reference pixels are prediction filtered in order to produce a prediction output. If the motion vector is a ½ pixel resolution motion vector, a drift compensation value is added to the prediction output. Then, the prediction output is added to the down converted P and B frame and field DCT coded blocks in order to form lower resolution reconstructed pixel blocks.

49 Claims, 9 Drawing Sheets

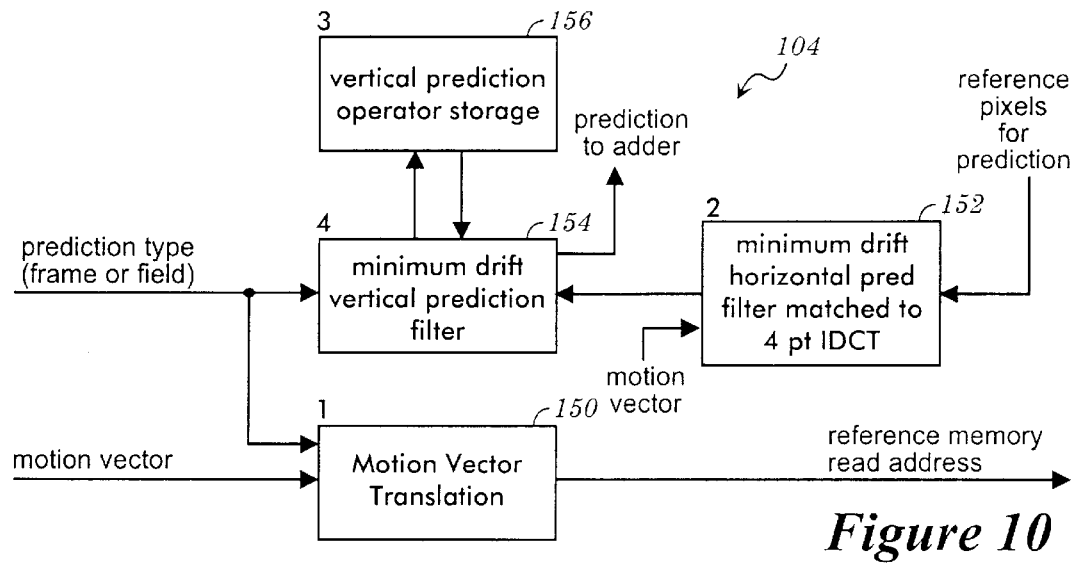
*Figure 10*
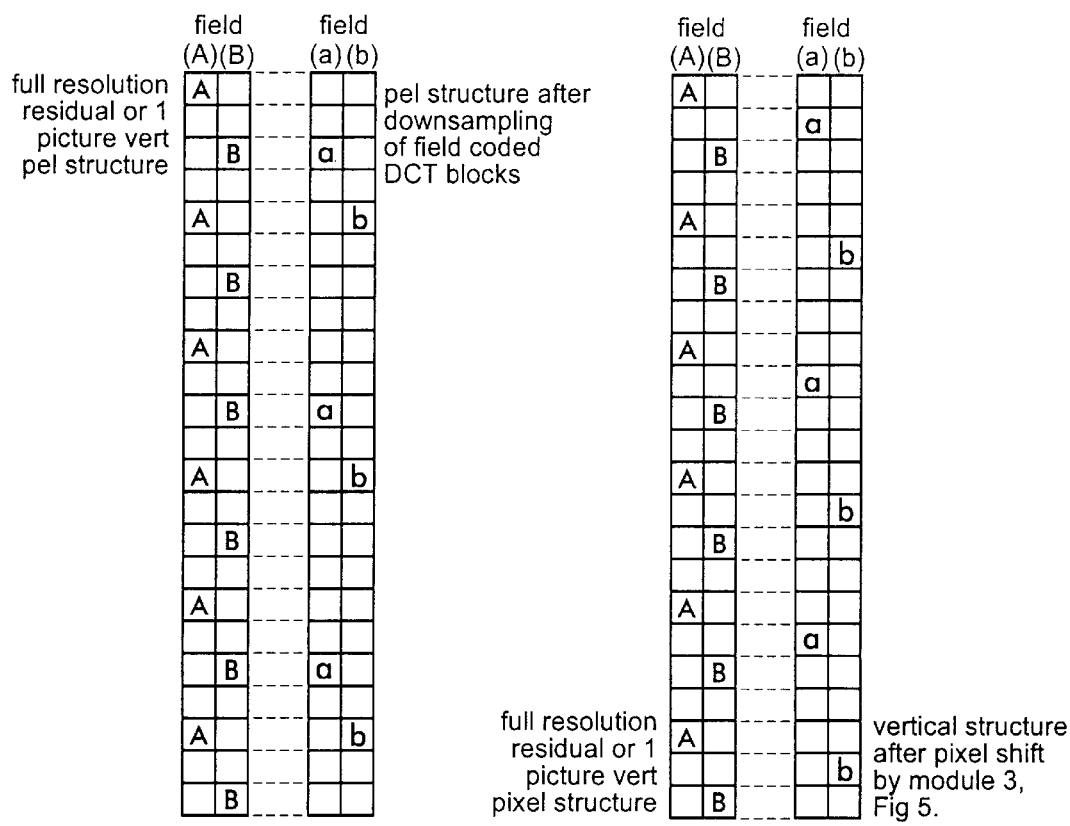
*Figure 11*  *Figure 12*

COMPENSATING FOR DRIFT IN THE DOWN CONVERSION OF HIGH DEFINITION SEQUENCES TO LOWER RESOLUTION SEQUENCES

RELATED APPLICATIONS

This application claims subject matter similar to the subject matter disclosed in U.S. patent application Ser. No. 09/106,367 filed Jun. 29, 1998 and in U.S. patent application Ser. No. 09/460,645 filed Dec. 15, 1999.

TECHNICAL FIELD OF THE INVENTION

The present invention relates to the application of drift compensation during the down conversion and decoding of high resolution encoded video for display by a lower resolution receiver.

BACKGROUND OF THE INVENTION

The international standard ISO/IEC 13818-2 entitled "Generic Coding of Moving Pictures and Associated Audio Information: Video" and "Guide to the Use of the ATSC Digital Television Standard" describe a system, known as MPEG-2, for encoding and decoding digital video data. The standard allows for the encoding of video over a wide range of resolutions, including higher resolutions commonly known as HDTV. According to this standard, digital video data is encoded as a series of code words in a complicated manner that causes the average length of the code words to be much smaller than would be the case if, for example, each pixel were coded as an 8 bit value. This type of encoding is also known as data compression.

In the system described above, encoded pictures are made up of pixels. Each 8×8 array of pixels is known as a block, and a 2×2 array of these 8×8 blocks is termed a macroblock. Compression is achieved using the well known techniques of prediction (motion estimation in the encoder, motion compensation in the decoder), two dimensional discrete cosine transformation (DCT) which is performed on 8×8 blocks of pixels, quantization of DCT coefficients, and Huffman and run/level coding. However, prediction is not used for every picture. Thus, while P pictures are encoded with prediction from previous pictures, and while B pictures are encoded using prediction from either a previous or a subsequent picture, I pictures are encoded without prediction.

An MPEG-2 encoder is shown in simplified form in FIG. 1. Data representing macroblocks of pixels are fed to both a subtractor 12 and a motion estimator 14. In the case of P pictures and B pictures, the motion estimator 14 compares each new macroblock to be encoded with the macroblocks in a reference picture previously stored in a reference picture memory 16. The motion estimator 14 finds the macroblock in the stored reference picture that most closely matches the new macroblock.

The motion estimator 14 reads this matching macro-block (known as a predicted macroblock) out of the reference picture memory 16 and sends it to the subtractor 12 which subtracts it, on a pixel by pixel basis, from the new macroblock entering the MPEG-2 encoder 10. The output of the subtractor 12 is an error, or residual, that represents the difference between the predicted macroblock and the new macroblock being encoded. This residual is often very small. The residual is transformed from the spatial domain by a two dimensional DCT 18. The DCT coefficients resulting from the two dimensional DCT 18 are then quantized by a quantization block 20 in a process that reduces the number of bits needed to represent each coefficient. Usually, many coefficients are effectively quantized to zero. The quantized DCT coefficients are Huffman and run/level coded by a coder 22 which further reduces the average number of bits per coefficient.

The motion estimator 14 also calculates a motion vector (mv) which represents the horizontal and vertical displacements of the predicted macroblock in the reference picture from the position of the new macroblock in the current picture being encoded. It should be noted that motion vectors may have ½ pixel resolution which is achieved by linear interpolation between adjacent pixels. The data encoded by the coder 22 are combined with the motion vector data from the motion estimator 14 and with other information (such as an indication of whether the picture is an I, P or B picture), and the combined data are transmitted to a receiver that includes an MPEG-2 decoder 30 (shown in FIG. 2 and discussed below).

For the case of P pictures, the quantized DCT coefficients from the quantization block 20 are also supplied to an internal decoder loop that represents a portion of the operation of the MPEG-2 decoder 30. Within this internal loop, the residual from the quantization block 20 is inverse quantized by an inverse quantization block 24 and is inverse DCT transformed by an inverse discrete cosine transform (IDCT) block 26. The predicted macroblock, that is read out of the reference picture memory 16 and that is supplied to the subtractor 12, is also added back to the output of the IDCT block 26 on a pixel by pixel basis by an adder 28, and the result is stored back into the reference picture memory 16 in order to serve as a macroblock of a reference picture for predicting subsequent pictures. The object of this internal loop is to have the data in the reference picture memory 16 of the MPEG-2 encoder 10 match the data in the reference picture memory of the MPEG-2 decoder 30. B pictures are not stored as reference pictures.

In the case of I pictures, no motion estimation occurs and the negative input to the subtractor 12 is forced to zero. In this case, the quantized DCT coefficients provided by the two dimensional DCT 18 represent transformed pixel values rather than residual values, as is the case with P and B pictures. As in the case of P pictures, decoded I pictures are stored as reference pictures.

The MPEG-2 decoder 30 illustrated in FIG. 2 is a simplified showing of an MPEC-2 decoder. The decoding process implemented by the MPEG-2 decoder 30 can be thought of as the reverse of the encoding process implemented by the MPEG-2 encoder 10. Accordingly, the received encoded data is Huffman and run/level decoded by a Huffman and run/level decoder 32. Motion vectors and other information are parsed from the data stream flowing through the Huffman and run/level decoder 32. The motion vectors are fed to a motion compensator 34. Quantized DCT coefficients at the output of the Huffman and run/level decoder 32 are fed to an inverse quantization block 36 and then to an IDCT block 38 which transforms the inverse quantized DCT coefficients back into the spatial domain.

For P and B pictures, each motion vector is translated by the motion compensator 34 to a memory address in order to read a particular macroblock (predicted macroblock) out of a reference picture memory 42 which contains previously stored reference pictures. An adder 44 adds this predicted macroblock to the residual provided by the IDCT block 38 in order to form reconstructed pixel data. For I pictures, there is no prediction, so that the prediction provided to the adder 44 is forced to zero. For I and P pictures, the output of the adder 44 is fed back to the reference picture memory 42 to be stored as a reference picture for future predictions.

The MPEG encoder 10 can encode sequences of progressive or interlaced pictures. For sequences of interlaced pictures, pictures may be encoded as field pictures or as frame pictures. For field pictures, one picture contains the odd lines of the raster, and the next picture contains the even lines of the raster. All encoder and decoder processing is done on fields. Thus, the DCT transform is performed on 8×8 blocks that contain all odd or all even numbered lines. These blocks are referred to as field DCT coded blocks.

On the other hand, for frame pictures, each picture contains both odd and even numbered lines of the raster. Macroblocks of frame pictures are encoded as frames in the sense that an encoded macroblock contains both odd and even lines. However, the DCT performed on the four blocks within each macroblock of a frame picture may be done in two different ways. Each of the four DCT transform blocks in a macroblock may contain both odd and even lines (frame DCT coded blocks), or alternatively two of the four DCT blocks in a macroblock may contain only the odd lines of the macroblock and the other two blocks may contain only the even lines of the macroblock (field DCT coded blocks). See ISO/IEC 13818-2, section 6.1.3, FIGS. 6-13 and 6-14. The coding decision as to which way to encode a picture may be made adaptively by the MPEG-2 encoder 10 based upon which method results in better data compression.

Residual macroblocks in field pictures are field DCT coded and are predicted from a reference field. Residual macroblocks in frame pictures that are frame DCT coded are predicted from a reference frame. Residual macroblocks in frame pictures that are field DCT coded have two blocks predicted from one reference field and two blocks predicted from either the same or the other reference field.

For sequences of progressive pictures, all pictures are frame pictures with frame DCT coding and frame prediction.

MPEG-2, as described above, includes the encoding and decoding of video at high resolution (HDTV). In order to permit people to use their existing NTSC televisions so as to view HDTV transmitted programs, it is desirable to provide a decoder that decodes high resolution MPEG-2 encoded data as reduced resolution video data for display on existing NTSC televisions. (Reducing the resolution of television signals is often called down conversion decoding.) Accordingly, such a down converting decoder would allow the viewing of HDTV signals without requiring viewers to buy expensive HDTV displays.

There are known techniques for making a down converting decoder such that it requires less circuitry and is, therefore, cheaper than a decoder that outputs full HDTV resolution. One of these methods is disclosed in U.S. Pat. No. 5,262,854. The down conversion technique disclosed there is explained herein in connection with a down convertor 50 shown in FIG. 3. The down convertor 50 includes a Huffman and run/level decoder 52 and an inverse quantization block 54 which operate as previously described in connection with the Huffman and run/level decoder 32 and the inverse quantization block 36 of FIG. 2. However, instead of utilizing the 8×8 IDCT block 38 as shown in FIG. 2, the down convertor 50 employs a down sampler 56 which discards the forty-eight high order DCT coefficients of an 8×8 block and performs a 4×4 IDCT on the remaining 4×4 array of DCT coefficients. This process is usually referred to as DCT domain down sampling. The result of this down sampling is effectively a filtered and down sampled 4×4 block of residual samples (for P or B pictures) or pixels for I pictures.

For residual samples, a prediction is added by an adder 58 to the residual samples from the down sampler 56 in order to produce a decoded reduced resolution 4×4 block of pixels. This block is saved in a reference picture memory 60 for subsequent predictions. Accordingly, predictions will be made from a reduced resolution reference, while predictions made in the decoder loop within the encoder are made from full resolution reference pictures. This difference means that the prediction derived from the reduced resolution reference will differ by some amount from the corresponding prediction made by the encoder, resulting in error in the residual-plus-prediction sum provided by the adder 58 (this error is referred to herein as prediction error). Prediction error may increase as predictions are made upon predictions until the reference is refreshed by the next I picture.

A motion compensator 62 attempts to reduce this prediction error by using the full resolution motion vectors, even though the reference picture is at lower resolution. First, a portion of the reference picture that includes the predicted macroblock is read from the reference picture memory 60. This portion is selected based on all bits of the motion vector except the least significant bit. This predicted macroblock is interpolated back to full resolution by a 2×2 prediction up sample filter 64. Using the full resolution motion vector (which may include ½ pixel resolution), a predicted full resolution macroblock is extracted from the up sampled portion based upon all of the bits of the motion vector. Then, a down sampler 66 performs a 2×2 down sampling on the extracted full resolution macro-block in order to match the resolution of the 4×4 IDCT output of the down sampler 56. In this way, the prediction from the reference picture memory 60 is up sampled to match the full resolution residual pixel structure allowing the use of full resolution motion vectors. Then, the full resolution reference picture is down sampled prior to addition by the adder 58 in order to match the resolution of the down sampled residual from the down sampler 56.

There are several known good prediction up sampling/down sampling methods that tend to minimize the prediction error caused by up sampling reference pictures that have been down sampled with a 4×4 IDCT. These methods typically involve use of a two dimensional filter having five to eight taps and tap values that vary both with the motion vector value for the predicted macroblock relative to the nearest macroblock boundaries in the reference picture, and with the position of the current pixel being interpolated within the predicted macroblock. Such a filter not only up samples the reduced resolution reference to full resolution and subsequently down samples in a single operation, but it can also include ½ pixel interpolation (when required due to an odd valued motion vector). (See, for example, "Minimal Error Drift in Frequency Scalability for Motion Compensated DCT Coding," Mokry and Anastassiou, *IEEE Transactions on Circuits and Systems for Video Technology,* August 1994, and "Drift Minimization in Frequency Scaleable Coders Using Block Based Filtering," Johnson and Princen, *IEEE Workshop on Visual Signal Processing and Communication,* Melbourne, Australia, September 1993.)

A more general derivation of minimum drift prediction filters by using the Moore-Penrose inverse of a block based down sampling filter is described in "Minimum Drift Architectures for 3-Layer Scalable DTV Decoding," Vetro, Sun, DaGraca and Poon, *IEEE Transactions on Consumer Electronics,* August 1998.

The following example is representative of the prediction up sampling/down sampling filter described in the Mokry and Johnson papers. This example is a one dimensional example but is easily extended to two dimensions. Let it be assumed that pixels y1 and pixels y2 as shown in FIG. 4 represent two adjacent blocks in a down sampled reference picture, and that the desired predicted block straddles the boundary between the two blocks. The pixels y1 are up sampled to the pixels p1 by using a four tap filter with a different set of tap values for each of the eight calculated pixels p1. The pixels y2 are likewise up sampled to the pixels p2 by using the same four tap filter. (If the motion vector requires ½ pixel interpolation, this interpolation is done using linear interpolation to calculate in between pixel values based on the pixels p1 and p2.) From these sixteen pixels p1 and pixels p2, an up sampled prediction consisting of eight pixels q can be read using the full resolution motion vector. The pixels q are then filtered and down sampled to pixels q' by an eight tap filter with a different set of tap values for each of the four pixels q'. The Johnson paper teaches how to determine the optimum tap values for these filters given that the reference picture was down sampled by a four point IDCT. The tap values are optimum in the sense that the prediction error is minimized. The Johnson and Mokry papers also show that the up sampling, linear interpolation, and down sampling filters can be combined into a single eight tap filter with tap values that depend on the motion vector value relative to the nearest macroblock boundaries in the reference picture, and that depend on the particular pixels q' being calculated. Accordingly, this single eight tap filter allows four pixels q' to be calculated directly from the eight pixels y1 and y2.

For methods of down sampling other than the four point IDCT, the Vetro paper describes how to determine the optimum tap values for the up sampling filter. This up sampling can also be combined with the linear interpolation and down sampling operations to form a single prediction filter.

The down convertor 50, while generally adequate for progressive pictures with frame DCT coded blocks, does not address problems that arise when attempting to down convert sequences of interlaced pictures with mixed frame and field DCT coded blocks. These problems arise with respect to vertical down sampling and vertical prediction filtering.

Let it be assumed that horizontal down sampling is performed in the DCT domain using a four point horizontal IDCT. Vertical down sampling may also utilize a four point IDCT or some other method. For field pictures, the vertical down sampling operation is then performed on incoming field coded blocks. For frame pictures, the vertical operation is performed on a mix of field and frame coded blocks. Thus, reference pictures may have been down sampled on a field basis, a frame basis, or a mix of both. As previously explained, low drift prediction filtering may be derived from the down sampling filter. If different reference pictures are down sampled differently, they will require different matching prediction filters.

Worse yet is the case of a reference picture containing a mix of field and frame down sampled blocks. A given required prediction may overlap both types of blocks. This complication may be resolved by converting all incoming blocks to either frames or fields before down sampling. This conversion will result in a consistent vertical structure for reference pictures so that the same prediction filter can always be used.

It has been suggested that all incoming pictures be converted to frames before performing vertical down sampling (see "Frequency Domain Down Conversion of HDTV Using Adaptive Motion Compensation," by Vetro, Sun, Bao and Poon, ICIP '97). Conversion to frames before performing vertical down sampling will result in better vertical resolution than would field based down sampling. However, frame based down sampling requires additional memory in the decoder because a first field must be stored when received in order to allow the second field to arrive so that frame blocks may be formed. Also, severe blocking artifacts in motion sequences may occur (see "Frequency Domain Down Conversion of HDTV Using an Optimal Motion Compensation Scheme," by Vetro and Sun, *Journal of Imaging Science and Technology*, August 1998).

An alternative, that would avoid these problems and that is suggested in the latter paper, is to convert all incoming pictures to fields before performing vertical down sampling. Therefore, field based processing is used herein such that incoming blocks which are frame coded are first converted to fields before vertical down sampling.

Also, it is well known that four point IDCT down sampling may cause visible artifacts. For progressive pictures, the degree of visibility is usually acceptable for both horizontal and vertical processing. For interlaced pictures using field based vertical down sampling, however, these artifacts may be much more visible. Thus, a technique other than the four point IDCT may be implemented for its field based vertical down sampling (a four point IDCT is still employed for horizontal down sampling).

Moreover, when a vertical or horizontal motion vector is odd valued, ½ pixel interpolation is required when forming a prediction from a full resolution reference or an up sampled reduced resolution reference. A decoder that linearly combines ½ pixel interpolation with other filtering operations can exhibit a drift error towards a darker picture until refreshed by the next I frame. The present invention is arranged to compensate for this drift error.

SUMMARY OF THE INVENTION

In accordance with one aspect of the present invention, a method is provided to reduce drift in connection with an application of ½ pixel resolution motion vectors during prediction filtering. The method comprises the following steps: a) down converting received P and B frame and field DCT coded blocks; b) selecting reference pixels based upon a received motion vector; c) performing prediction filtering on the selected reference pixels to produce a prediction output; d) if the motion vector is a ½ pixel resolution motion vector, adding a drift compensation value to the prediction output; and, e) adding the prediction output to the down converted P and B frame and field DCT coded blocks in order to form lower resolution reconstructed pixel blocks.

In accordance with another aspect of the present invention, a method of reconstructing pixel blocks from P and B DCT coded blocks comprises the following steps: a) selecting reference pixels from a memory in response to a motion vector; b) filtering the selected reference pixels to produce a filtered output; c) if the motion vector has ½ pixel resolution, adding a drift compensation value to the filtered output; and, d) adding the filtered output to the P and B DCT coded blocks in order to form the reconstructed pixel blocks.

In accordance with still another aspect of the present invention, a method of reconstructing pixel blocks from P and B DCT coded blocks comprises the following steps: a) selecting reference pixels from a memory in response to a motion vector; b) if the motion vector has ½ pixel resolution, adding drift compensation to the selected reference pixels; and, c) adding the selected reference pixels to the P and B DCT coded blocks in order to form the reconstructed pixel blocks.

BRIEF DESCRIPTION OF THE DRAWINGS

These and other features and advantages of the present invention will become more apparent from a detailed consideration of the invention when taken in conjunction with the drawings in which:

FIG. 10 shows a block diagram of a motion compensator of FIG. 5 in additional detail; and, FIGS. 11–12 show additional sets of pixel data useful in describing the present invention.

DETAILED DESCRIPTION

I.—Down Conversion

Figure 5:
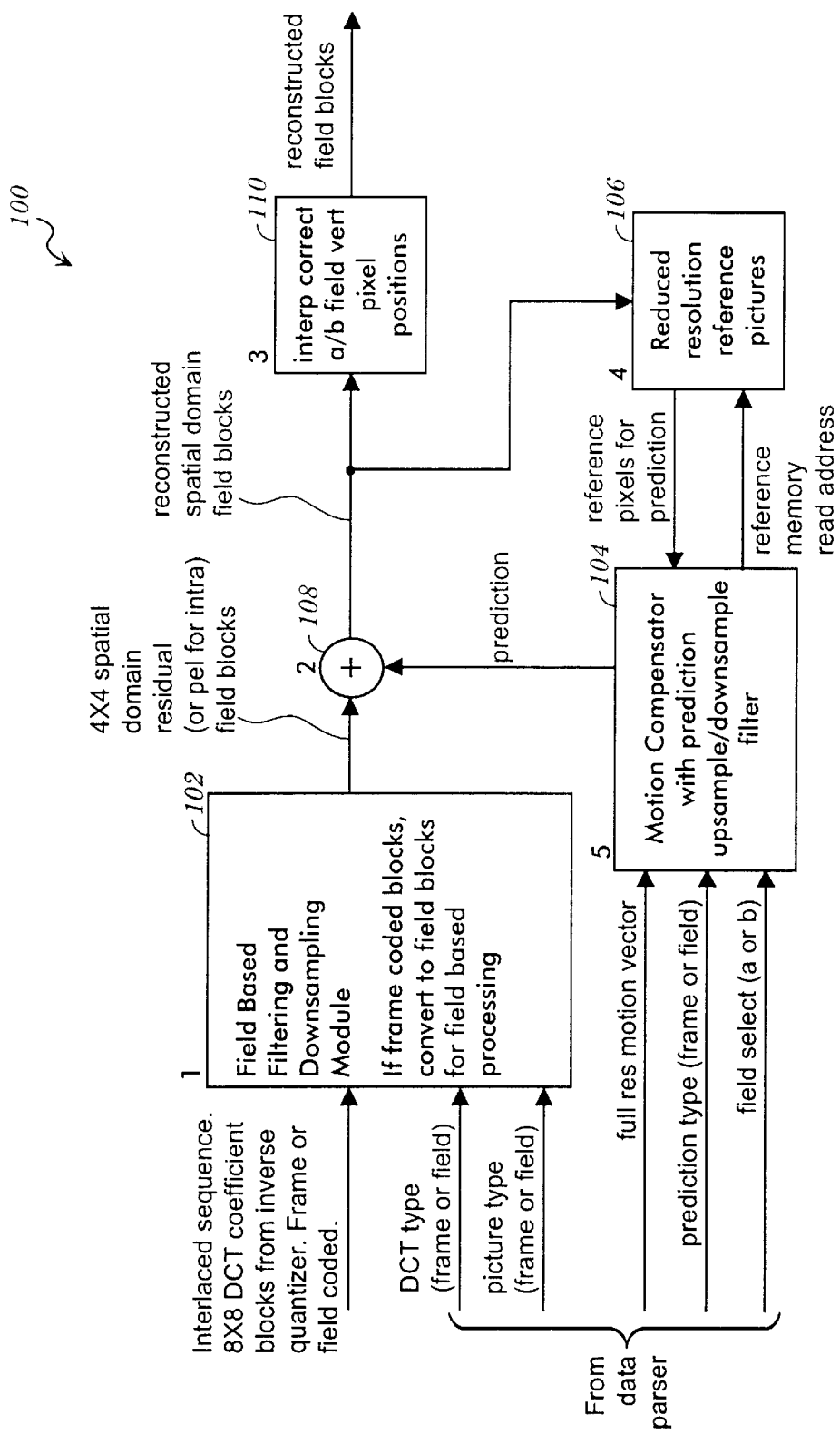
FIG. 5 is a block diagram of a down converting decoder according to the present invention.

A down converting decoder 100 according to an embodiment of the present invention is shown in FIG. 5. For vertical processing, the down converting decoder 100 implements DCT domain frame to field conversion, a field based vertical eight point IDCT, vertical spatial interblock filtering and down sampling, and complimentary vertical minimum drift prediction filtering. For horizontal processing, the down converting decoder 100 implements a horizontal four point IDCT for filtering and down sampling, and complimentary horizontal minimum drift prediction filtering.

Figure 3:
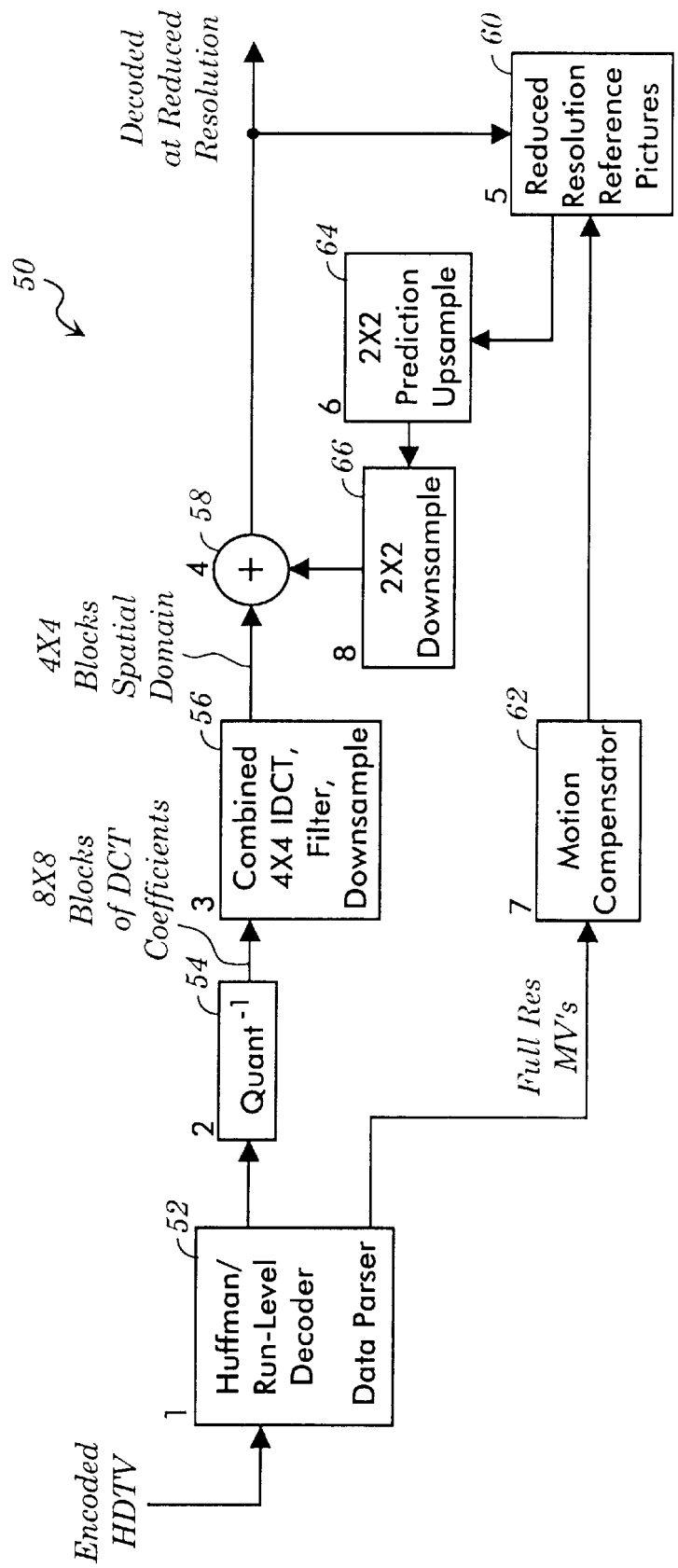
FIG. 3 is a block diagram of a known down conversion decoder for an HDTV application.
Figure 4:
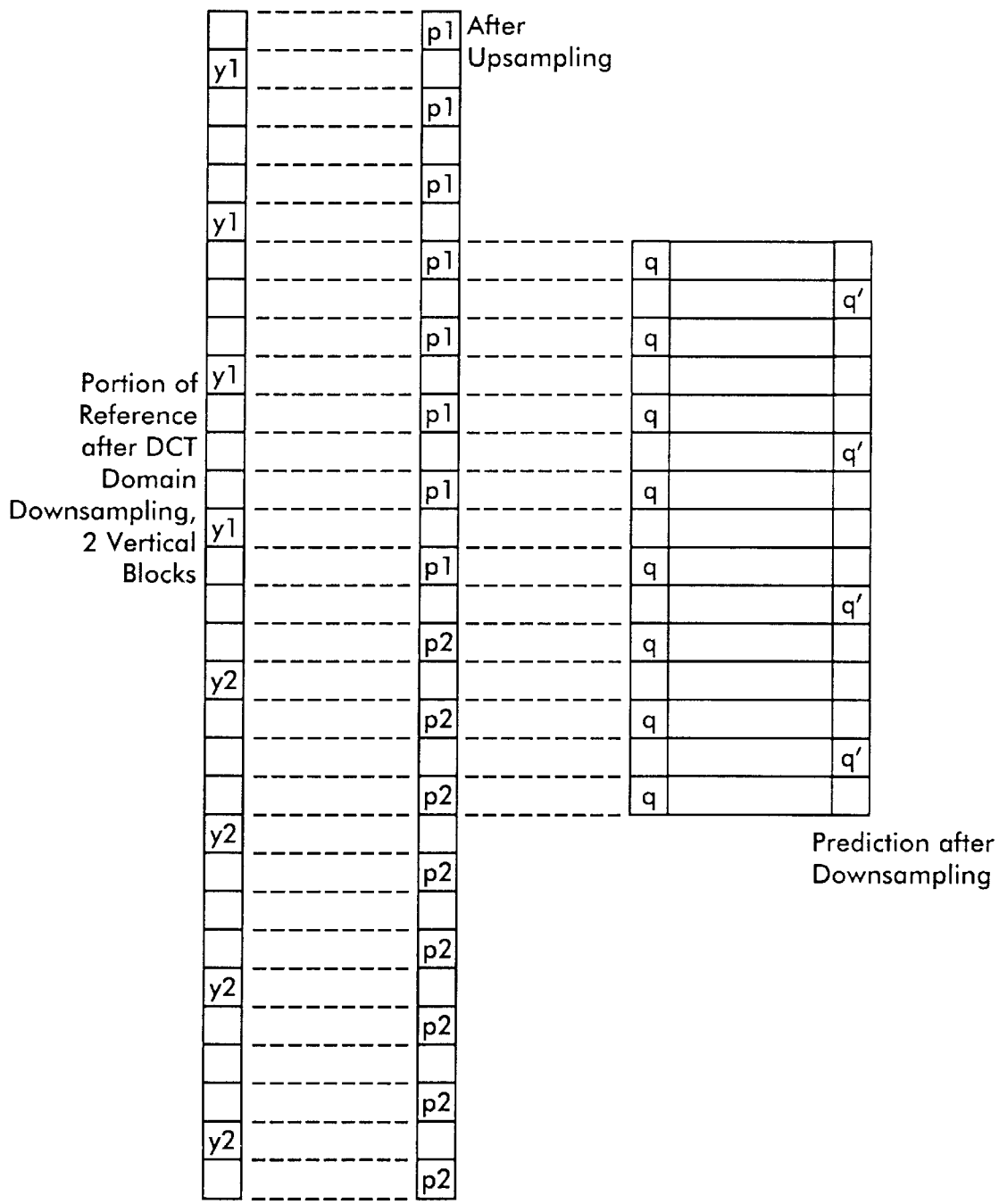
FIG. 4 shows an exemplary set of pixel data useful in describing the background of the present invention.

A filtering and down sampling module 102 of the down converting decoder 100 receives its input from the inverse quantizer 54 of FIG. 3. The vertical processing performed by the filtering and down sampling module 102 is described herein in detail. The vertical filtering consists of an eight tap low pass symmetric FIR filter which is a cubic filter derived from equation (8) in "Reconstruction Filters in Computer Graphics," by Mitchell and Netravali, *Siggraph* 1988, with B=C=⅓. Accordingly, the tap values of this filter are given by the following equation:

$$[f]_8 = [f(-3) \ldots f(4)] = [-0.0074\ -0.0117\ 0.1280\ 0.3911\ 0.3911\ 0.1280\ -0.0117\ -0.0074] \quad (1)$$

This eight point vertical filter is effectively used to execute a continuous interblock field based vertical filtering operation with the filter $[f]_8$ operating on received residual and I field pixel blocks.

Vertical filtering and down sampling implemented by the filtering and down sampling module 102 is given by the following equation and can be viewed as a vertical spatial domain operation on an entire field done one column (of 540 pixels) at a time:

$$[d]_{270 \times 540}[x]_{540 \times 1} = [x']_{270 \times 1} \quad (2)$$

where [x] is a column of pixels from a field of pixels to be filtered and down sampled, [x'] is the resulting vertically filtered and down sampled column of pixels, and [d] is a down sampling operator given by the following circulant matrix:

$$([d])_{270 \times 540} = \quad (3)$$

$$\begin{bmatrix}
f(0) \ldots f(4), 0 \ldots & \ldots 0, f(-3) \ldots f(-1) \\
f(-2) \ldots f(4), 0 \ldots & \ldots 0, f(-3) \\
0, f(-3) \ldots f(4), 0 \ldots & \ldots 0 \\
0, 0, 0, f(-3) \ldots f(4), 0 \ldots & \ldots 0 \\
0 \ldots & \ldots 0, f(-3) \ldots f(4), 0, 0, 0 \\
0 \ldots & \ldots 0, f(-3) \ldots f(4), 0 \\
f(4), 0 \ldots & \ldots 0, f(-3) \ldots f(1) \\
f(2) \ldots f(4), 0 \ldots & \ldots 0, f(-3) \ldots f(1)
\end{bmatrix}_{270 \times 540}$$

(According to the nomenclature used here, capital letters are used to denote the DCT domain, and small letters are used to denote the spatial domain.) Each row of [d] contains all zeroes except for the eight elements of the filter $[f]_8$. Also, the eight elements of the filter $[f]_8$ in a row are shifted right by two places with respect to the previous row.

In a decoder, it is not particularly practical for the operator $[d]_{270 \times 540}$ to operate on entire columns of entire fields. Therefore, in accordance with the present invention, and in a manner described below, the filter $[f]_8$ operates vertically on residual and I blocks as they arrive. This interblock vertical filtering and down sampling can be combined with intrablock vertical eight point IDCT in an efficient manner.

IA1.—Field Pictures (All Macroblocks Field DCT Coded): Vertical Processing

In order to vertically filter a particular eight point block column, the DCT coefficients for that block column, and for the block columns above and below it, must have been received and stored.

Let $[X_b]_{8 \times 1}$ be the eight point coefficient block column to be vertically filtered and down sampled in order to produce four filtered and down sampled pixels $[X_b']_{4 \times 1}$. Then, let $[X_a]_{8 \times 1}$ and $[X_c]_{8 \times 1}$ be the block columns above and below $[X_b]$.

Figure 1:
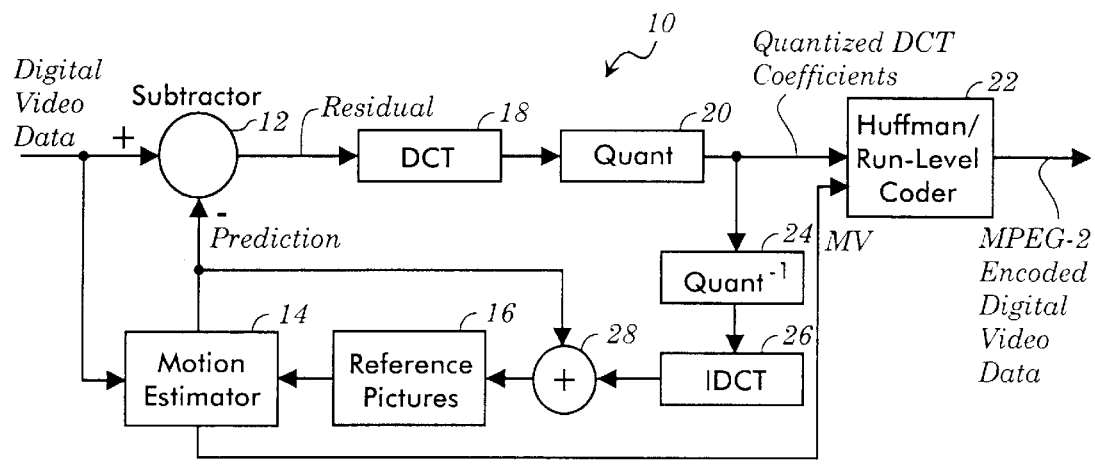
FIG. 1 is a simplified block diagram of a known MPEG-2 encoder.
Figure 2:
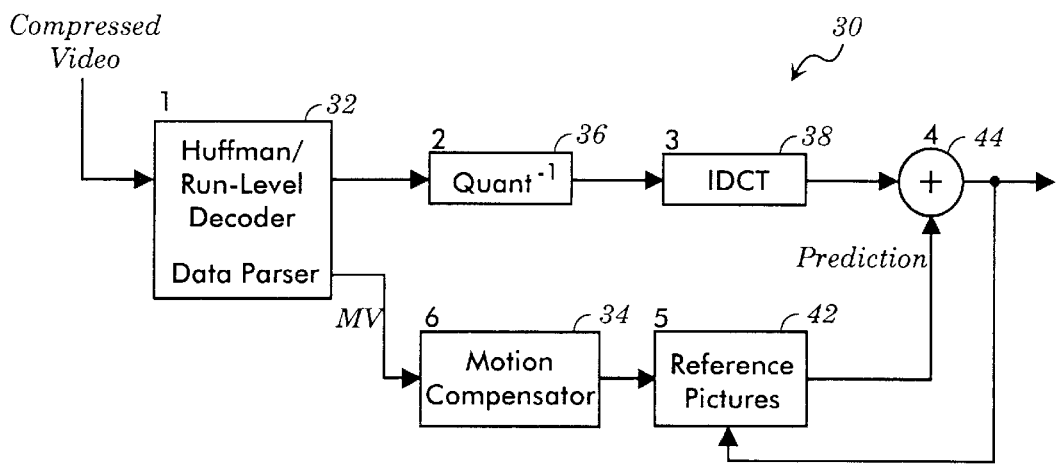
FIG. 2 is a simplified block diagram of a known MPEG-2 decoder.

Matrix $[FT]_{8 \times 8}$ is the eight point forward DCT transform matrix that is used by the two dimensional DCT 18 of FIG. 1 in order to convert residual and pixel values to DCT coefficients. Therefore, the rows of $[FT]_{8 \times 8}$ consist of the well known eight point DCT basis vectors. The transpose of $[FT]_{8 \times 8}$ gives the eight point IDCT transform matrix. Thus, $[IT]_{8 \times 8} = [FT]^T$. Let $$[IT^3] = \begin{bmatrix} [IT] & 0 & 0 \\ 0 & [IT] & 0 \\ 0 & 0 & [IT] \end{bmatrix}_{24 \times 24} \quad (4)$$

The matrix $[IT^3_{mid}]_{14 \times 24}$ is defined as the middle fourteen rows of $[IT^3]$ such that the top five rows and bottom five rows have been eliminated from $[IT^3]$. The matrix $[IT^3_{mid}]_{14 \times 24}$ is applied to the eight point coefficient block column $[X_b]_{8 \times 1}$ as well as the block columns $[X_a]_{8 \times 1}$ and $[X_c]_{8 \times 1}$ above and below $[X_b]$ according to the following equation:

$$[IT^3_{mid}]\begin{bmatrix} X_a \\ X_b \\ X_c \end{bmatrix}_{24\times 1} = [x]_{14\times 1} \quad (5)$$

where $[x]_{14\times 1}$ are the 14 full resolution pixels needed as inputs for the down sampling filter in order to calculate the four down sampled pixels for block b (i.e., the block $[x_b]_{4\times 1}$). If $[d]_{4\times 14}$ is a down sampling filter given by the following equation:

$$([d])_{4\times 14} = \begin{bmatrix} ([f])_8 & 0 & 0 & 0 & 0 & 0 & 0 \\ 0 & 0 & ([f])_8 & 0 & 0 & 0 & 0 \\ 0 & 0 & 0 & 0 & ([f])_8 & 0 & 0 \\ 0 & 0 & 0 & 0 & 0 & 0 & ([f])_8 \end{bmatrix}_{4\times 14} \quad (6)$$

then applying this down sampling filter [d] to the fourteen pixels $[x]_{14\times 1}$ yields the desired down sampled pixels $[x_b']_{4\times 1}$ (i.e., $[d][x]_{14\times 1} = [X_{b'4\times 1}]$).

The IDCT and down sampling operations can be combined into a single step per block column according to the following equation:

$$[d]_{4\times 14}[IT^3_{mid}]_{14\times 24} = [Q_{dit}]_{4\times 24} \quad (7)$$

Applying this IDCT/down sampling filter $[Q_{dit}]_{4\times 24}$ to the twenty-four pixels of the three block columns $[X_a]$, $[X_b]$, and $[X_c]$ yields the desired down sampled pixels $[X_b']_{4\times 1}$ according to the following equation:

$$([Q_{dit}])_{4\times 24}\begin{bmatrix} X_a \\ X_b \\ X_c \end{bmatrix}_{24\times 1} = ([x_b'])_{4\times 1} \quad (8)$$

IA2.—Field Pictures: Two Dimensional Processing

The above discussion is easily extended to two dimensional 8×8 field DCT coded blocks with vertical processing on each column using $[Q_{dit}]$ as described above and with horizontal processing on each row using a four point horizontal IDCT. Accordingly, $X_b$ is redefined to be an 8×8 DCT coefficient block, and $X_a$ and $X_c$ are redefined to be the 8×8 DCT coefficient blocks above and below the 8×8 DCT coefficient block $X_b$, respectively.

As a first step in extending the down sampling filter of the present invention to two dimensional 8×8 field DCT coded blocks, the high order horizontal coefficients of each of the blocks $X_a$, $X_b$, and $X_c$ are discarded so that each is an 8×4 array (i.e., the left half of each block is retained) so that $[Z_a]_{8\times 4}$ is the left half of $[X_a]_{8\times 8}$ and so that $[Z_b]_{8\times 4}$ and $[Z_c]_{8\times 4}$ are similarly defined. These matrices are stacked and defined according to the following equation:

$$([Z])_{24\times 4} = \begin{bmatrix} ([Z_a])_{8\times 4} \\ ([Z_b])_{8\times 4} \\ ([Z_c])_{8\times 4} \end{bmatrix} \quad (9)$$

Vertical filtering and down sampling of the pixels $[Z]_{24\times 4}$ can then be performed in accordance with the following equation:

$$[G_b]_{4\times 4} = [Q_{dit}]_{4\times 24}[Z]_{24\times 4} \quad (10)$$

where $[Q_{dit}]_{4\times 24}$ is the IDCT/down sampling filter given by equation (7). Horizontal IDCT domain filtering and down sampling may then be applied to the results $[G_b]_{4\times 4}$ of equation (10) according to the following equation:

$$([x_b'])_{4\times 4} = ([G_b])_{4\times 4}\left[T4\frac{]_{4\times 4}}{\sqrt{2}}\right] \quad (11)$$

where [T4] is the four point DCT basis vector matrix containing the well known four point basis vectors.

IB1.—Frame Pictures: Vertical Processing: Assume that All Macroblocks are Frame DCT Coded In the case of frame pictures in which all macroblocks are frame DCT coded, it is preferable to implement frame to field conversion, field based vertical eight point IDCT, field based vertical interblock filtering, and down sampling in a single efficient step.

A macroblock column may be defined to be any sixteen point column (i.e., two vertical block columns) of a 16×16 macroblock. In order to apply a single interblock vertical operator, the DCT coefficients for the macroblock column, and for the macroblock columns above and below it, must have been received and stored. Accordingly, let $[X_b]_{16\times 1}$ be the sixteen point frame coded macroblock column (i.e., two eight point vertical blocks) which is to be filtered and down sampled in order to produce the eight field based pixels defined as $[xtop_b']_{4\times 1}$ for the top field and $[xbot_b']_{4\times 1}$ for the bottom field. Also, let $[X_a]_{16\times 1}$ and $[X_c]_{16\times 1}$ be the frame DCT coded macroblock columns above and below $[X_b]$. The is frame DCT coded macroblock columns $[X_a]$, $[X_b]$, and $[X_c]$ may be assembled in accordance with the following equation:

$$([X_{frame}])_{48\times 1} = \begin{bmatrix} X_a \\ X_b \\ X_c \end{bmatrix}_{48\times 1} \quad (12)$$

An unshuffling operator that can pre-multiply a sixteen pixel frame ordered column so as to reorder the even and odd pixel lines into top and bottom fields can be defined according to the following equation:

$$([US])_{16\times 16} = \begin{bmatrix} \begin{bmatrix} 1 & 0 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 1 & 0 \end{bmatrix}_{8\times 16} \\ \begin{bmatrix} 0 & 1 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix}_{8\times 16} \end{bmatrix}_{16\times 16} \quad (13)$$

The unshuffling operator [US] may be applied to a frame ordered macroblock column of pixels $[x_b]$ which is the inverse DCT of $[X_b]$ in accordance with the following equation:

$$[US][x_b]_{16\times 1} = \begin{bmatrix} ([xtop_b])_{8\times 1} \\ ([xbot_b])_{8\times 1} \end{bmatrix}_{16\times 1} \quad (14)$$

where $[xtop_b]$ and $[xbot_b]$ are the pixels $[x_b]$ reordered into top and bottom field pixels, respectively. If [FT8] is the eight point DCT forward transform matrix with rows that are the known eight point DCT basis vectors, the inverse of [FT8] is given by $[FT8]^T$. Let $$[IT8_2] = \begin{bmatrix} FT8^T & \\ & FT8^T \end{bmatrix}_{16 \times 16} \quad (15)$$

where $[IT8_2]$ is an IDCT operator for two vertically stacked eight point DCT block columns. Then the operators [US] and $[IT8_2]$ can be combined into a single operator [USIT] according to the following equation:

$$[USIT]_{16 \times 16} = [US][IT8_2] \quad (16)$$

From equations (14) and (16), the following equation results:

$$[USIT][X_b]_{16 \times 1} = \begin{bmatrix} ([xtop_b])_{8 \times 1} \\ ([xbot_b])_{8 \times 1} \end{bmatrix}_{16 \times 1} \quad (17)$$

The top eight rows of [USIT] may be defined as $[USIT_{top}]_{8 \times 16}$, and the bottom eight rows of [USIT] may be defined as $[USIT_{bot}]_{8 \times 16}$. These newly defined operators may be applied to $[X_b]$ in accordance with the following equations:

$$[USIT_{top}]_{8 \times 16}[X_b]_{16 \times 1} = [xtop_b]_{8 \times 1} \quad (18)$$

and $$[USIT_{bot}]_{8 \times 16}[X_b]_{16 \times 1} = [xbot_b]_{8 \times 1} \quad (19)$$

An operator $[USIT_{top3}]_{24 \times 48}$ is defined in accordance with the following equation:

$$([USIT_{top3}])_{24 \times 48} = \begin{bmatrix} [USIT_{top}] & 0 & 0 \\ 0 & [USIT_{top}] & 0 \\ 0 & 0 & [USIT_{top}] \end{bmatrix}_{24 \times 48} \quad (20)$$

The operator $[USIT_{top3}]_{24 \times 48}$ may be applied to the coefficients in the blocks $X_a$, $X_b$, and $X_c$ according to the following equation:

$$[USIT_{top3}]\begin{bmatrix} X_a \\ X_b \\ X_c \end{bmatrix}_{48 \times 1} = \begin{bmatrix} [xtop_a] \\ [xtop_b] \\ [xtop_c] \end{bmatrix}_{24 \times 1} \quad (21)$$

However, only the middle fourteen pixels are required as inputs to the down sampling filter (i.e., the top five and the bottom five pixels may be discarded from the right hand side of equation (21)). Therefore, an operator $[MID_{top}]_{14 \times 48}$ may be defined. The operator $[MID_{top}]_{14 \times 48}$ contains only the middle fourteen rows of $[USIT_{top3}]$. The mid top unshuffling operator $[MID_{top}]_{14 \times 48}$ may be applied to the coefficients in the blocks $X_a$, $X_b$, and $X_c$ according to the following equation:

$$([MID_{top}])_{14 \times 48}\begin{bmatrix} X_a \\ X_b \\ X_c \end{bmatrix}_{48 \times 1} = ([xtop])_{14 \times 1} \quad (22)$$

where $[xtop]_{14 \times 1}$ are the unshuffled fourteen pixels needed as inputs to the top field down sampling filter in order to calculate the top field down sampled and filtered pixels $[Xtop_b']_{4 \times 1}$.

The mid bottom unshuffling operator $[MID_{bot}]_{14 \times 48}$ may be derived in the same manner. This mid bottom unshuffling operator $[MID_{bot}]_{14 \times 48}$ may be applied to the coefficients in the blocks $X_a$, $X_b$, and $X_c$ according to the following equation:

$$([MID_{bot}])_{14 \times 48}\begin{bmatrix} X_a \\ X_b \\ X_c \end{bmatrix}_{48 \times 1} = ([xbot])_{14 \times 1} \quad (23)$$

where $[xbot]_{14 \times 1}$ are the unshuffled fourteen pixels needed as inputs to the bottom field down sampling filter in order to calculate the bottom field down sampled and filtered pixels $[xbot_b']_{4 \times 1}$.

The down sampling filter $[d]_{4 \times 14}$ can be combined with the IDCT/unshuffling operators [MID] as IDCT, unshuffling, and down sampling filters $[QL_{top}]_{4 \times 48}$ and $[QL_{bot}]_{4 \times 48}$ according to the following equations;

$$[QL_{top}]_{4 \times 48} = [d]_{4 \times 14}[MID_{top}]_{14 \times 48} \quad (24)$$

and $$[QL_{bot}]_{4 \times 48} = [d]_{4 \times 14}[MID_{bot}]_{14 \times 48} \quad (25)$$

The unshuffling, IDCT, and down sampling filters $[QL_{top}]_{4 \times 48}$ and $[QL_{bot}]_{4 \times 48}$ may be applied to the coefficients in the blocks $X_a$, $X_b$, and $X_c$ according to the following equations in order to perform eight point vertical IDCT, frame to field conversion, vertical interblock filtering, and down sampling in a single step:

$$[QL_{top}]_{4 \times 48}\begin{bmatrix} X_a \\ X_b \\ X_c \end{bmatrix}_{48 \times 1} = [xtop_b']_{4 \times 1} \quad \text{and} \quad (26)$$

$$[QL_{bot}]_{4 \times 48}\begin{bmatrix} X_a \\ X_b \\ X_c \end{bmatrix}_{48 \times 1} = [xbot_b']_{4 \times 1} \quad (27)$$

The unshuffling and down sampling filters $[QL_{top}]_{4 \times 48}$ and $[QL_{bot}]_{4 \times 48}$ can be combined as a single unshuffling and down sampling filter according to the following equation:

$$\begin{bmatrix} [QL_{top}] \\ [QL_{bot}] \end{bmatrix}_{8 \times 48} = ([QL])_{8 \times 48} \quad (28)$$

Accordingly, the unshuffling and down sampling filter $[QL]_{8 \times 48}$ may be applied to the coefficients in the blocks $X_a$, $X_b$, and $X_c$ in a single step according to the following equation:

$$([QL])_{8 \times 48}\begin{bmatrix} X_a \\ X_b \\ X_c \end{bmatrix}_{48 \times 1} = \begin{bmatrix} [xtop_b'] \\ [xbot_b'] \end{bmatrix}_{8 \times 1} \quad (29)$$

IB2.—Frame Pictures: Vertical Processing; Assume that Some Macroblocks are Frame DCT Coded and Some are Field DCT Coded As discussed above, frame pictures may contain a mix of frame and field DCT coded macroblocks. Thus, any of macroblock columns $[X_a]$, $[X_b]$ or $[X_c]$ may be frame or field coded. If it is assumed, for example, that $[X_a]$ is field coded and that $[X_b]$ and $[X_c]$ are frame coded, then the field coded macroblock column $[X_a]$ is received according to the following equation:

$$([X_a])_{16\times 1} = \begin{bmatrix} [Xtop_a] \\ [Xbot_a] \end{bmatrix} \quad (30)$$

Therefore, this macroblock column $[X_a]$ need not be split into field columns as the macroblock columns $[X_b]$ and $[X_c]$ must be. As a result, the unshuffling operator is not needed and the IDCT operator may be applied according to the following equation:

$$([IT8_2])_{16\times 16}[X_a]_{16\times 1} = \begin{bmatrix} ([Xtop_a])_{8\times 1} \\ ([Xbot_a])_{8\times 1} \end{bmatrix} \quad (31)$$

It should also be noted that $[IT8_{2top}]_{8\times 16}[X_a]_{16\times 1}=[xtop_a]_{8\times 1}$ and that $[IT8_{2bot}]_{8\times 16}[X_a]_{16\times 1}=[xbot_a]_{8\times 1}$.

A combined unshuffling and IDCT operator may be defined according to the following equation (which is similar to equation (20)):

$$([USIT_{top3}])_{24\times 48} = \begin{bmatrix} [OP_{topa}] & 0 & 0 \\ 0 & [OP_{topb}] & 0 \\ 0 & 0 & [OP_{topc}] \end{bmatrix}_{24\times 48} \quad (32)$$

where $[OP_{topn}]=[USIT_{top}]$ if the vertical macroblock $[X_n]$ is frame coded, and $[OP_{topn}]=[IT8_{2top}]$ if the vertical macroblock $[X_n]$ is field coded. There are $2^3=8$ possible configurations for this flexible operator $[USIT_{top3}]$. In the case of the field coded vertical macroblock column $[X_a]$ and frame coded vertical macroblock columns $[X_b]$ and $[X_c]$ of the above example, the operator $[USI_{top3}]$ is given by the following equation:

$$([USIT_{top3}])_{24\times 48} = \begin{bmatrix} [IT8_{2top}] & 0 & 0 \\ 0 & [USIT_{top}] & 0 \\ 0 & 0 & [USIT_{top}] \end{bmatrix}_{24\times 48} \quad (33)$$

As before, the operator $[MID_{top}]_{14\times 48}$ contains the middle fourteen rows of $[USIT_{top3}]_{24\times 48}$. In the same manner, flexible operators $[USIT_{bot3}]_{24\times 48}$ and $[MID_{bot}]_{14\times 48}$ can be derived. The [MID] operators can be combined with the down sampling filter [d] in the manner of equations (24) and (25) so as to form flexible operators $[QL_{top}]$ and $[QL_{bot}]$ for any combination of frame or field DCT coded macroblocks.

Thus, for any combination of frame or field DCT coded macroblocks, a combined operator which includes an eight point IDCT, frame to field conversion, and interblock filtering and down sampling can be devised according to the following equations:

$$([QL_{top}])_{4\times 48} \begin{bmatrix} X_a \\ X_b \\ X_c \end{bmatrix}_{48\times 1} = ([xtop'_b])_{4\times 1} \quad (34)$$

and $$[QL_{bot}]_{4\times 48} \begin{bmatrix} X_a \\ X_b \\ X_c \end{bmatrix}_{48\times 1} = [xbot'_b]_{4\times 1} \quad (35)$$

The top and bottom [QL] operators can be combined in accordance with the following equation:

$$\begin{bmatrix} [QL_{top}] \\ [QL_{bot}] \end{bmatrix}_{8\times 48} = ([QL])_{8\times 48} \quad (36)$$

Thus, the unshuffling and down sampling filter $[QL]_{8\times 48}$ may be applied to the coefficients in the blocks $X_a$, $X_b$, and $X_c$ in a single step per macroblock column according to the following equation:

$$([QL])_{8\times 48} \begin{bmatrix} X_a \\ X_b \\ X_c \end{bmatrix}_{48\times 1} = \begin{bmatrix} [xtop'_b] \\ [xbot'_b] \end{bmatrix}_{8\times 1} \quad (37)$$

IB3.—Frame Pictures: Two Dimensional Processing

The above discussion relates only to vertical processing of either frame coded or field coded frame pictures, but may be easily extended to two dimensional 16×16 macroblocks with vertical processing on each column using $[QL]_{8\times 48}$ from equation (37) as described above and horizontal processing on each row of each 8×8 block with a four point IDCT.

Accordingly, let $X_a$, $X_b$, and $X_c$ be redefined to be three vertically stacked 16×16 macroblocks according to the following equations:

$$([X_a])_{16\times 16} = \begin{bmatrix} ([X_{a1}])_{8\times 8} & ([X_{a2}])_{8\times 8} \\ ([X_{a3}])_{8\times 8} & ([X_{a4}])_{8\times 8} \end{bmatrix} \quad (38)$$

and $$[X_b]_{16\times 16} = \begin{bmatrix} [X_{b1}]_{8\times 8} & [X_{b2}]_{8\times 8} \\ [X_{b3}]_{8\times 8} & [X_{b4}]_{8\times 8} \end{bmatrix} \quad (39)$$

and $$[X_c]_{16\times 16} = \begin{bmatrix} [X_{c1}]_{8\times 8} & [X_{c2}]_{8\times 8} \\ [X_{c3}]_{8\times 8} & [X_{c4}]_{8\times 8} \end{bmatrix} \quad (40)$$

The left and right halves of the macroblock $[X_a]_{16\times 16}$ may be redefined in accordance with the following equations:

$$([X_{aL}])_{16\times 8} = \begin{bmatrix} ([X_{a1}])_{8\times 8} \\ ([X_{a3}])_{8\times 8} \end{bmatrix} \quad (41)$$

and $$[X_{aR}]_{16\times 8} = \begin{bmatrix} [X_{a2}]_{8\times 8} \\ [X_{a4}]_{8\times 8} \end{bmatrix} \quad (42)$$

The macroblocks $[X_{bL}]_{16\times 8}$, $[X_{bR}]_{16\times 8}$, $[X_{cL}]_{16\times 8}$, and $[X_{cR}]_{16\times 8}$ may be similarly defined.

As a first step in developing an operator for performing vertical processing on each column using $[QL]_{8\times 48}$ from equation (37) as described above and horizontal processing on each row of each 8×8 block with a four point IDCT, the high order horizontal coefficients of each 8×8 block [X] are discarded so that each 8×8 block [X] becomes a an 8×4 block [Z]. Thus, $[Z_{a1}]_{8\times 4}$ is defined as the left half of $[X_{a1}]_{8\times 8}$, $[Z_{a2}]_{8\times 4}$ is defined as the left half of $[X_{a2}]_{8\times 8}$, $[Z_{a3}]_{8\times 4}$ is defined as the left half of $[X_{a3}]_{8\times 8}$, and $[Z_{a4}]_{8\times 4}$ is defined as the left half of $[X_{a4}]_{8\times 8}$. These 8×4 blocks can be combined in accordance with the following equations:

$$([Z_{aL}])_{16\times 4} = \begin{bmatrix} ([Z_{a1}])_{8\times 4} \\ ([Z_{a3}])_{8\times 4} \end{bmatrix} \quad (43)$$

-continued and $$[Z_{aR}]_{16\times 4} = \begin{bmatrix} [Z_{a2}]_{8\times 4} \\ [Z_{a4}]_{8\times 4} \end{bmatrix} \quad (44)$$

$[Z_{bL}]_{16\times 4}$, $[Z_{bR}]_{16\times 4}$, $[Z_{cL}]_{16\times 4}$, and $[Z_{cR}]_{16\times 4}$ can be similarly defined. Then, field based vertical filtering and down sampling of the left and right halves of $[X_b]$ is given by the following equations (using the flexible operator [QL], from equation (32)):

$$([QL])_{8\times 48} = \quad (45)$$

$$\begin{bmatrix} [Z_{aL}] \\ [Z_{bL}] \\ [Z_{cL}] \end{bmatrix}_{48\times 4} = ([QL])_{8\times 48}[Z_L]_{48\times 4} = \begin{bmatrix} ([Gtop_{bL}])_{4\times 4} \\ ([Gbot_{bL}])_{4\times 4} \end{bmatrix}$$

and $$[QL]_{8\times 48} = \quad (46)$$

$$\begin{bmatrix} [Z_{aR}] \\ [Z_{bR}] \\ [Z_{cR}] \end{bmatrix}_{48\times 4} = ([QL])_{8\times 48}[Z_R]_{48\times 4} = \begin{bmatrix} ([Gtop_{bR}])_{4\times 4} \\ ([Gbot_{bR}])_{4\times 4} \end{bmatrix}$$

Then, horizontal DCT domain filtering and down sampling is performed according to the following equations:

$$\begin{bmatrix} [xtop'_{bL}]_{4\times 4} \\ [xbot'_{bL}]_{4\times 4} \end{bmatrix} = \begin{bmatrix} [Gtop_{bL}]_{4\times 4} \\ [Gbot_{bL}]_{4\times 4} \end{bmatrix} \frac{[T4]_{4\times 4}}{\sqrt{2}} \quad (47)$$

and $$\begin{bmatrix} [xtop'_{bR}]_{4\times 4} \\ [xbot'_{bR}]_{4\times 4} \end{bmatrix} = \begin{bmatrix} [Gtop_{bR}]_{4\times 4} \\ [Gbot_{bR}]_{4\times 4} \end{bmatrix} \frac{[T4]_{4\times 4}}{\sqrt{2}} \quad (48)$$

where [T4] is the four point DCT basis vector matrix. Thus, the two dimensional down sampled and filtered macroblock is given by the following expression:

$$\begin{bmatrix} [xtop'_{bL}]_{4\times 4} & [xtop'_{bR}]_{4\times 4} \\ [xbot'_{bL}]_{4\times 4} & [xbot'_{bR}]_{4\times 4} \end{bmatrix} \quad (49)$$

IC.—IDCT Module: Block Diagram (FIG. 5, Module 102)

Figure 6:
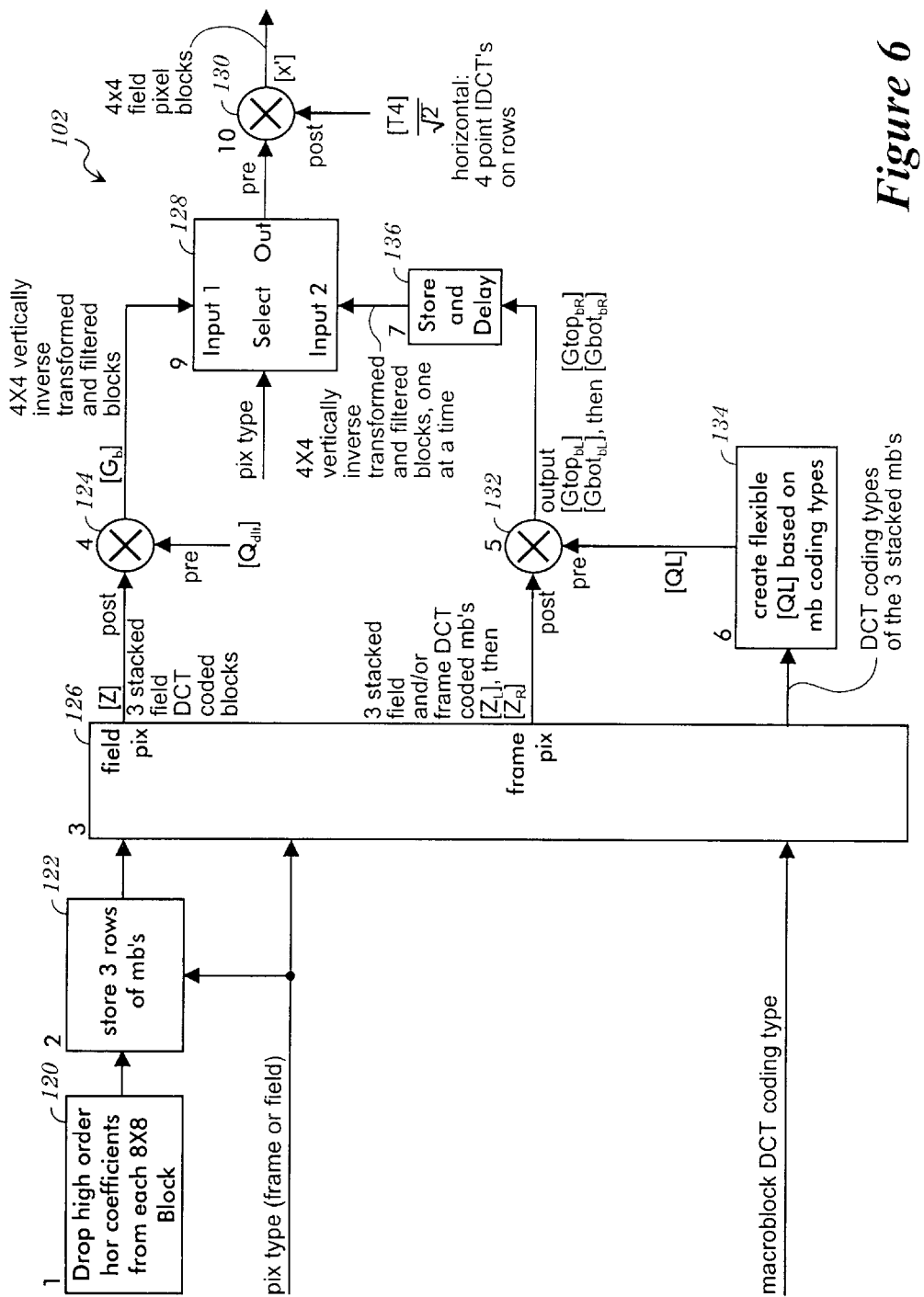
FIG. 6 shows an embodiment of an IDCT module of FIG. 5.

The filtering and down sampling module 102 of FIG. 5 is shown in more detail in FIG. 6 and utilizes the above derived operators $[Q_{dit}]$ for field pictures and [QL] for frame pictures in order to perform vertical processing as well as the four point IDCT operator [T4] for horizontal processing. Thus, the filtering and down sampling module 102 can handle both field pictures (containing all field DCT coded blocks) and frame pictures containing only frame DCT coded macroblocks or a mix of field DCT coded macroblocks and frame DCT coded macroblocks. The output of the filtering and down sampling module 102 is always field based filtered and down sampled. All blocks undergo the same horizontal processing (the four point IDCT), but for vertical processing, the [QL] operator is used when necessary to effectively convert the frame coding to field coding, and then to filter and down sample each field separately. It should be noted that matrix multiplication is not commutative (i.e., A*B does not in general equal B*A). Therefore, each matrix multiplier has a pre and a post input.

IC1.—Field Pictures

A coefficient discarder 120 of FIG. 6 drops the four high order horizontal coefficients from each row of every 8×8 DCT coefficient block. A memory 122 stores three rows of I or residual coefficient macroblocks. (A row of macroblocks consists of a rectangle of pixels one macroblock high by the number of macroblocks needed to go from the left to the right side of a picture.) In case of unsent residual macroblocks, all coefficients are assumed to be zero. Three vertically stacked blocks $[Z]_{24\times 4}$ (see equation (9)) at a time are read from the memory 122 and are directed to a vertical matrix multiplier 124 by a router 126 in response to a DCT coding type (field or frame).

The vertical matrix multiplier 124 performs the eight point vertical IDCT with vertical interblock filtering and down sampling in accordance with equation (10). Thus, the vertical matrix multiplier 124 pre-multiplies the three vertically stacked blocks $[Z]_{24\times 4}$ by $[Q_{dit}]_{4\times 24}$ in order to produce $[G_b]_{4\times 4}$. A selector 128 directs the vertically processed block $[G_b]$ to a horizontal matrix multiplier 130. The horizontal matrix multiplier 130 performs a horizontal four point IDCT on $[G_b]$ in accordance with equation (11) so as to produce $[x_b']$.

IC2.—Frame Pictures

The coefficient discarder 120 drops the four high order horizontal coefficients from each row of every 8×8 coefficient block as before. The memory 122 stores three rows of I or residual coefficient macroblocks. In case of unsent residual macroblocks, all coefficients are assumed to be zero. Three vertically stacked macroblocks consisting of $[Z_L]_{48\times 4}$, then $[Z_R]_{48\times 4}$ (see equations (45) and (46), for example) at a time are read from the memory 122 and are directed by the router 126 to a vertical matrix multiplier 132 in response to the DCT coding type (field or frame). The router 126 also routs the DCT coding type (field or frame) for each macroblock to QL module 134. Based on the coding types of the three vertically stacked macroblocks comprising $[Z_L]$ and $[Z_R]$, the QL module 134 creates a flexible [QL] operator as previously discussed for the "pre" input to the vertical matrix multiplier 132.

The vertical matrix multiplier 132 performs an eight point vertical IDCT, frame to field conversion on frame coded macroblocks, and interblock filtering on $[Z_L]$, then on $[Z_R]$ as in equations (45) and (46). The output from the vertical matrix multiplier 132 is first $$\begin{bmatrix} [Gtop_{bL}]_{4\times 4} \\ [Gbot_{bL}]_{4\times 4} \end{bmatrix}$$

and then $$\begin{bmatrix} [Gtop_{bR}]_{4\times 4} \\ [Gbot_{bR}]_{4\times 4} \end{bmatrix}.$$

These output matrices are fed to a store and delay module 136 which then provides the following 4×4 blocks one at a time to horizontal matrix multiplier 130 through the selector 128: $[Gtop_{bL}]$, $[Gbot_{bL}]$, $[Gtop_{bR}]$, $[Gbot_{bR}]$. The horizontal matrix multiplier 130 performs a horizontal four point IDCT on the rows of each 4×4 input block to produce the following corresponding 4×4 output blocks in accordance with equation (47) and (48): $[xtop_{bL}']$, $[xbot_{bL}']$, $[xtop_{bR}']$, $[xbot_{bR}']$ II.—Prediction Up Sampling and Down Sampling IIA.—Derivation of Vertical Up Sampling Filter Matrix [u]

The vertical prediction filtering implemented by the motion compensator 104 of FIG. 5 is now explained. An up sampling filter [u] applied by the motion compensator 104 is determined from the well known Moore-Penrose inverse of the down sampling operator [d] from equations (2) and (3) in accordance with the following equation:

$$[u]_{540\times 270}=[d]^T\{[d]^T[d]\}^{-1} \quad (50)$$

The up sampling filter [u] is applied to a column of a reduced resolution reference picture $[x']_{270\times 1}$ from a memory 106 in accordance with the following equation:

$$[u]_{540\times 270}[x']_{270\times 1}=[\hat{x}]_{540\times 1} \quad (51)$$

where $[\hat{x}]_{540\times 1}$ is the resulting up sampled column of pixels. The structure of [u] is based on the following twenty-one tap (with thirteen non-zero taps) filters:

[$g_1$(−10) ... $g_1$(10)]=[0 0 0 0 0 0 0 0 .0011 .0372 1.2542 −.4051 .1546 −.0576 .0215 −.0081 .0030 −.0011 .0004 −.0002 .0001]

and

[$g_2$(−10) ... $g_2$(10)]=[.0001 −.0002 .0004 −.0011 .0030 −.0081 .0215 −.0576 .1546 −.4051 1.2542 .0372 .0011 0 0 0 0 0 0 0 0].

The filter [$g_2$] has the same tap values as the filter [$g_1$] except in reverse order, and $g_1(0)=g_2(0)=1.2542$. The up sampling filter [u] is a circulant matrix consisting of one step shifted versions of [$g_1$] and [$g_2$] on alternate rows. Accordingly, the up sampling filter [u] is given by the following equation:

$$[u] = \begin{bmatrix} g_1(0)\ldots g_1(10), 0\ldots & & \ldots 0, g_1(-10)\ldots g_1(-1) \\ g_2(0)\ldots g_2(10), 0\ldots & & \ldots 0, g_2(-10)\ldots g_2(-1) \\ g_1(-1)\ldots g_1(10), 0\ldots & & \ldots 0, g_1(-10)\ldots g_1(-2) \\ g_2(-1)\ldots g_2(10), 0\ldots & & \ldots 0, g_2(-10)\ldots g_2(-2) \\ & & \\ 0\ldots & g_1(-10)\ldots g_1(10) & \ldots 0 \\ 0\ldots & g_2(-10)\ldots g_2(10) & \ldots 0 \\ & & \\ g_1(2)\ldots g_1(10), 0\ldots & & \ldots 0, g_1(-10)\ldots g_1(1) \\ g_2(2)\ldots g_2(10), 0\ldots & & \ldots 0, g_2(-10)\ldots g_2(1) \\ g_1(1)\ldots g_1(10), 0\ldots & & \ldots 0, g_1(-10)\ldots g_1(0) \\ g_2(1)\ldots g_2(10), 0\ldots & & \ldots 0, g_2(-10)\ldots g_2(0) \end{bmatrix}_{540\times 370} \quad (52)$$

It may be possible to achieve a good enough prediction using only the eight (or fewer) largest value non-zero taps of $g_1$ and $g_2$. The fewer non-zero taps, the less reference data that must be read from the memory 106 for each macroblock prediction. For example, adequate prediction may be achieved with the filters given by the following equations:

[$g_1$]$_{13}$=[0 0 0 0 0 .0372 1.2542 −.4051 .1546 −.0576 .0215 −.0081 .0030] (53)

and

[$g_2$]$_{13}$=[.0030 −.0081 .0215 −.0576 .1546 −.4051 1.2542 .0372 0 0 0 0 0] (54)

The vertical up sampling operation using the filters $g_1$ and $g_2$ of equations (53) and (54) can be thought of as follows. To calculate the up sampled pixel above a particular reference pixel in a down sampled reference field [x'], the center value of the filter $g_1$ (i.e., the value at $g_1$(0)) is aligned with that reference pixel and a sum of products is performed between the non-zero taps and the aligned pixels. To calculate the up sampled pixel below this particular reference pixel in the down sampled reference field [x'], the center value of the filter $g_2$ (i.e., the value at $g_2$(0)) is aligned with that reference pixel and a sum of products is performed between the non-zero taps and the aligned pixels.

In the down converting decoder 100, when an up sampled prediction is formed by the motion compensator 104, entire columns need not be read from the reference memory 106 to be filtered by [u]. Instead, only enough pixels need to be read to satisfy the combined need of a prediction filter formed from the up sampler filters [$g_1$] and [$g_2$] (each 13 taps) and the down sampler [f] of equation (1) as described below.

IIB.—Combined Prediction Up Sampling and Down Sampling

IIB1.—Field Prediction for Field Pictures

Figure 7:
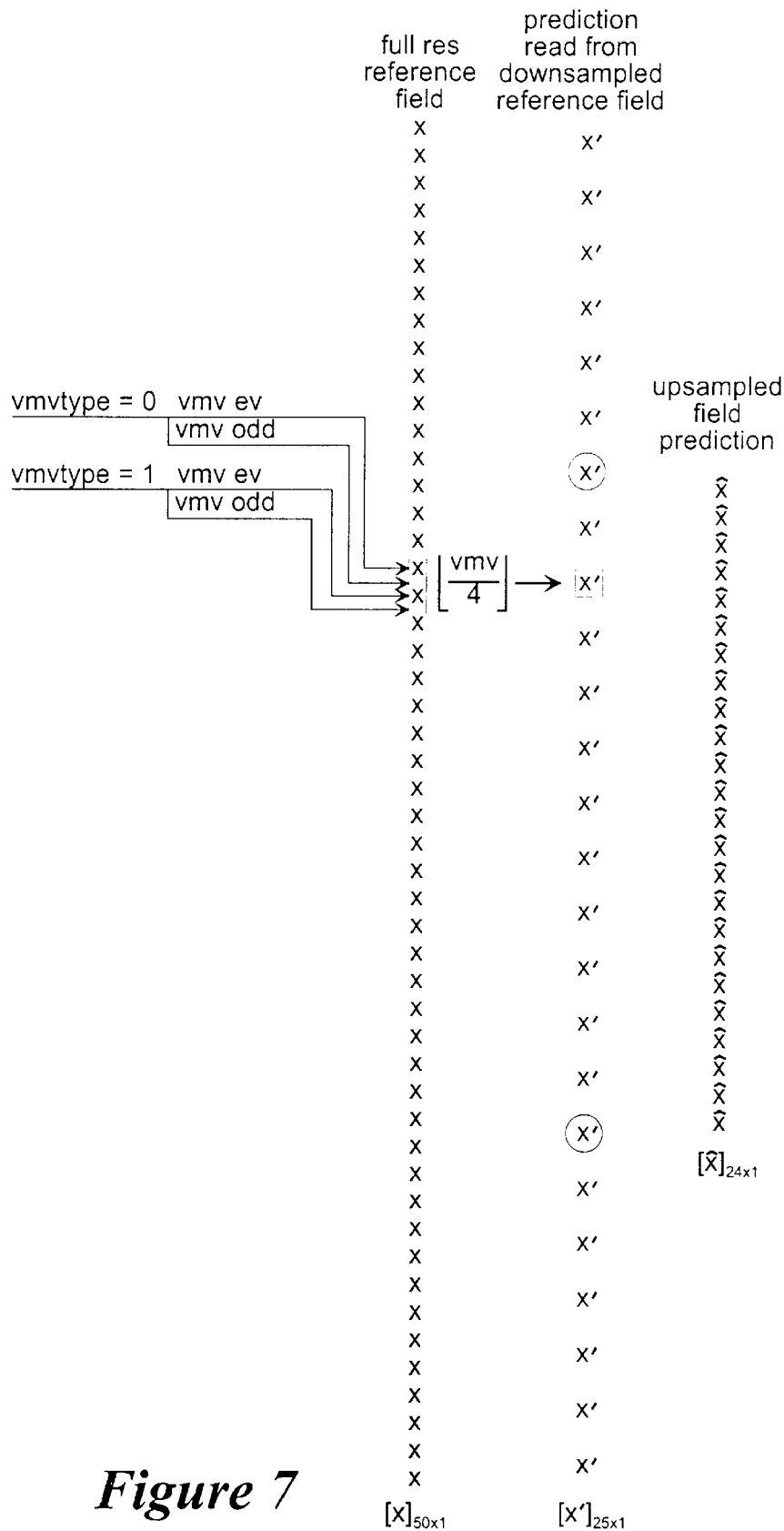
FIGS. 7–9 show exemplary sets of pixel data useful in describing the present invention.

As shown in FIG. 7, the first column represents a portion of a column of pixels $[x]_{50\times 1}$ from a field in the full resolution reference picture 16 as it exists in the encoder 10 of FIG. 1. The second column represents the corresponding portion of a column of pixels $[x']_{25\times 1}$ from that field in the down sampled reference 106 in the decoder loop of FIG. 5. The vertical full resolution motion vector (vmv) for a desired field prediction points to the indicated pixel in the first column. This motion vector is in units of ½ pixel so that, if vmv is odd, it points between pixels at full resolution.

It is instructive to consider the modulo values of vmv as defined by:

$$vmvtype = \left\lfloor \frac{vmv \% 4}{2} \right\rfloor \quad (55)$$

where % means the modulo operation. The value of vmvtype will be 0 or 1, and FIG. 7 illustrates both cases. When vmvtype=0, the vertical motion vector vmv points to or just below the top pixel of a pair of pixels in a full resolution reference field (i.e., the pixels with the rectangular box around them in the first column of FIG. 7). A pixel in the down sampled reference field (i.e., the pixel with the square box around it in the second column of FIG. 7) is between the pixels of this pair of pixels. When vmvtype=1, the vertical motion vector vmv points to or just below the bottom pixel of this pair of pixels. Again, the pixel in the down sampled reference field is between the pixels of this pair of pixels. The low resolution motion vector lvmv, which is used to access the prediction from the down sampled reference field, is given by the following equation:

$$lvmv = \left\lfloor \frac{vmv}{4} \right\rfloor \quad (56)$$

This low resolution motion vector lvmv points to the pixel in the down sampled reference field (i.e., the pixel with the square box around it in the second column of FIG. 7). The input to the prediction filter must include that pixel in the down sampled reference field together with the eight pixels above it and the sixteen pixels below it. These twenty-five pixels shown in the second column of FIG. 7 are the exact amount that must be read as the input to the vertical prediction filtering process in order to produce a predicted vertical field macroblock.

The next column in FIG. 7 is $[\hat{x}]_{24 \times 1}$ which represents the up sampled field prediction produced by the filters $g_1$ and $g_2$ which are arranged as shown in equation (52). The circled pixels in the second column of FIG. 7 represent the upper and lower limits between which the $g_1$ and $g_2$ filter center taps traverse for the up sampling convolution filtering operation. This up sampling filtering operation is given by the following equation:

$$[u][x']_{25 \times 1} = [\hat{x}]_{24 \times 1} \tag{57}$$

where $[X']_{25 \times 1}$ represents a column of twenty-five pixels from the reference picture, $[\hat{x}]_{24 \times 1}$ represents the up sampled pixels, and the up sampling filter $[u]$ is based upon equations (53) and (54) and is given by the following equation:

$$[u]_{24 \times 25} = \begin{bmatrix} [g_2]_{13}, 0 \ldots & \ldots 0 \\ 0, [g_1]_{13}, 0 \ldots & \ldots 0 \\ 0, [g_2]_{13}, 0 \ldots & \ldots 0 \\ & \\ 0 \ldots & \ldots 0, [g_1]_{13}, 0 \\ 0 \ldots & \ldots 0, [g_2]_{13}, 0 \\ 0 \ldots & \ldots 0, [g_1]_{13} \end{bmatrix}_{24 \times 25} \tag{58}$$

After up sampling, a subsequent prediction down sampling operation is then needed to produce the final desired down sampled field prediction macroblock $[\hat{x}']_{8 \times 1}$ column. This down sampling, which is described below, depends on vmvtype (as given by equation (56)) and whether vmv is even or odd.

vmvtype=0

For the case of an even valued vertical motion vector vmv, the desired down sampled field prediction is given by the convolution of $[f]_8$ with $[\hat{x}]_{24 \times 1}$ as follows:

$$[d_0][\hat{x}]_{24 \times 1} = [\hat{x}']_{8 \times 1} \tag{59}$$

where $[\hat{x}]_{24 \times 1}$ is a column of up sampled reference pixels to be down sampled, where $[\hat{x}']_{8 \times 1}$ are the resulting down sampled reference pixels, where the prediction down sample filter $[d_0]$ is given by the following equation:

$$[d_0]_{8 \times 24} = \begin{bmatrix} [f]_8, 0 \ldots & \ldots 0 \\ 0, 0, [f]_8, 0 \ldots & \ldots 0 \\ & \\ 0 \ldots & \ldots 0, [f]_8, 0, 0 \end{bmatrix}_{8 \times 24} \tag{60}$$

and where $[f]_8$ is from equation (1). The vertical prediction up sample and down sample filtering can be combined into a single operation given by the following equation:

$$[PL_{0-ev}][x']_{25 \times 1} = [\hat{x}']_{8 \times 1} \tag{61}$$

where $[x']_{25 \times 1}$ is a column of reference pixels from the memory 106, where $[x']_{8 \times 1}$ are the pixels resulting from the prediction up sampling and down sampling, and where the up sampling and down sampling filter $[PL_{0-ev}]$ is given by the following equation:

$$[d_0][u] = [PL_{0-ev}]_{8 \times 25} \tag{62}$$

For the vmv odd valued case, up sampling must be followed by ½ pixel linear interpolation given by the following equation:

$$[LI][\hat{x}]_{24 \times 1} = [\hat{x}_l]_{24 \times 1} \tag{63}$$

where $[\hat{x}]_{24 \times 1}$ are the pixels resulting from prediction up sampling, where $[\hat{x}_l]_{24 \times 1}$ are the prediction up sampled pixels resulting from linear interpolation, and where the linear interpolation filter $[LI]$ is given by the following equation:

$$[LI]_{24 \times 24} = \begin{bmatrix} 1/2 & 1/2 & 0 \ldots & & \ldots 0 \\ 0 & 1/2 & 1/2 & 0 \ldots & \ldots 0 \\ & & & & \\ 0 \ldots & & & \ldots 0 & 1/2 & 1/2 \\ 0 \ldots & & & \ldots 0 & & \end{bmatrix}_{24 \times 24} \tag{64}$$

Then down sampling is performed in accordance with the following equation:

$$[d_0][\hat{x}_l]_{24 \times 1} = [\hat{x}']_{8 \times 1}$$

Vertical prediction up sampling, linear interpolation, and prediction down sampling can be combined into a single operation as given by the following equation:

$$[PL_{0-odd}][x']_{25 \times 1} = [\hat{x}_l']_{8 \times 1} \tag{65}$$

where the combined vertical prediction up sampling, linear interpolation, and prediction down sampling filter $[PL_{0-odd}]_{8 \times 25}$ is given by the following equation:

$$[d_0][LI][u] = [PL_{0-odd}]_{8 \times 25} \tag{66}$$

vmvtype=1

For the case of an even valued vertical motion vector vmv, the desired down sampled field prediction is given by the convolution of $[f]_8$ with $[\hat{x}]_{24 \times 1}$ as follows:

$$[d_1][\hat{x}]_{24 \times 1} = [\hat{x}']_{8 \times 1} \tag{67}$$

where the prediction down sampling filter $[d_1]$ is given by the following equation:

$$[d_1]_{8 \times 24} = \begin{bmatrix} 0, [f]_8, 0 \ldots & \ldots 0 \\ 0, 0, 0, [f]_8, 0 \ldots & \ldots 0 \\ & \\ 0 \ldots & \ldots 0, [f]_8, 0 \end{bmatrix}_{8 \times 24} \tag{68}$$

The vertical prediction up sample and down sample filtering can be combined into a single operation according to the following equation:

$$[PL_{1-ev}][x']_{25 \times 1} = [\hat{x}']_{8 \times 1} \tag{69}$$

where the combined vertical prediction up sample and down sample filter $[PL_{1-ev}]$ is given by the following equation:

$$[d_1][u] = [PL_{1-ev}]_{8 \times 25} \tag{70}$$

For the case of an odd valued vertical motion vector vmv, up sampling must be followed by ½ pixel linear interpolation given by equation (63). Then, down sampling is performed in accordance with equation (67). The vertical up sampling, linear interpolation, and down sampling can be combined into a single operation given by the following equation:

$$[PL_{1-odd}][x']_{25\times 1}=[\hat{x}_i']_{8\times 1} \tag{71}$$

where the combined vertical up sampling, linear interpolation, and down sampling filter $[PL_{1-odd}]$ is given by the following equation:

$$[d_1][LI][u]=[PL_{1-odd}]_{8\times 25} \tag{72}$$

IIB2.—Field Prediction for Frame Pictures

Figure 8:
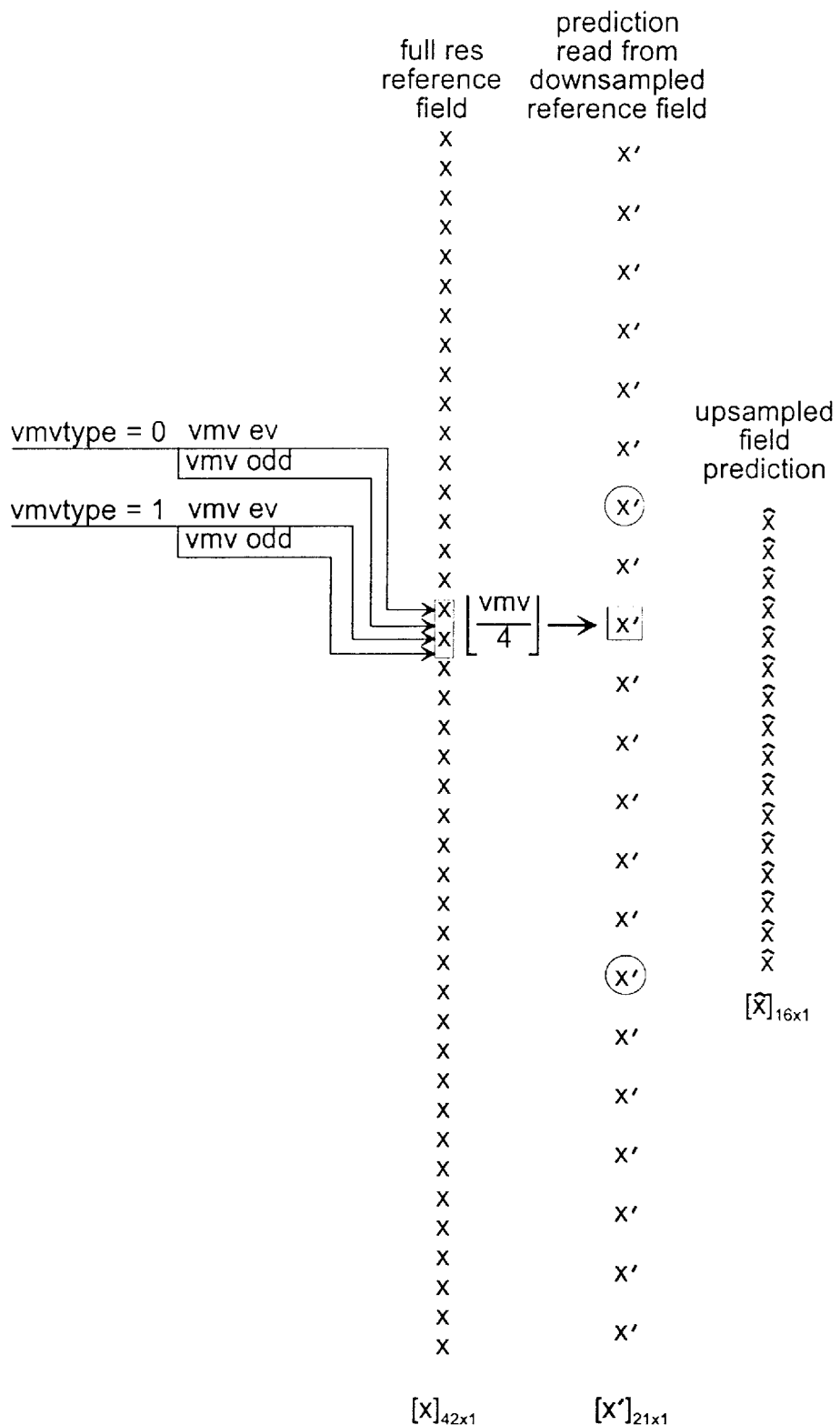

In the case of field prediction for frame pictures, two independent field predictions for the frame macroblock are required. As shown in FIG. 8, the first column represents a portion of a column of pixels $[x]_{42\times 1}$ from a field in the full resolution reference picture 16 as it exists in the encoder 10 of FIG. 1. The second column represents the corresponding portion of a column of pixels $[x']_{21\times 1}$ from that field in the down sampled reference 106 in the decoder loop of FIG. 5. The full resolution vertical motion vector (vmv) for a desired field prediction points to the indicated pixel in the first column. This motion vector is in units of ½ pixel. Accordingly, if the full resolution vertical motion vector vmv is odd valued, it points between pixels at full resolution.

It is again instructive to consider the modulo values of vmv as given by equation (55). As indicated, the value of vmvtype will be 0 or 1. FIG. 8 illustrates both cases. When vmvtype=0, the vertical motion vector vmv points to or just below the top pixel of a pair of pixels in a full resolution reference field (i.e., the pixels with the rectangular box around them in the first column of FIG. 8). A pixel in the down sampled reference field (i.e., the pixel with the square box around it in the second column of FIG. 8) is between the pixels of this pair of pixels. When vmvtype=1, the vertical motion vector vmv points to or just below the bottom pixel of this pair of pixels. Again, the pixel in the down sampled reference field is between the pixels of this pair of pixels. The low resolution motion vector lvmv, which is used to access the prediction from the down sampled reference field, is given by equation (56). This low resolution motion vector lvmv points to the pixel in the down sampled reference field (second column) with the box around it. The input to the prediction filter must include that pixel, the eight pixels above it, and the twelve pixels below it. These twenty-one pixels are the exact number of pixels that must be read as inputs to the vertical prediction filtering process in order to produce a predicted vertical field block.

The third column in FIG. 8 is $[\hat{x}]_{16\times 1}$ which represents the up sampled field prediction produced by the filters $g_1$ and $g_2$ given in equations (53) and (54). The circled pixels in the second column $[x']_{21\times 1}$ represent the upper and lower limits between which the center taps of the filters $g_1$ and $g_2$ traverse during the up sampling convolution operation.

The up sampling operation is given by the following equation:

$$[u][x']_{21\times 1}=[\hat{x}]_{16\times 1} \tag{73}$$

where $[x']_{21\times 1}$ is twenty-one pixels from the reference picture stored in the memory 106, $[\hat{x}]_{16\times 1}$ are the resulting up sampled pixels, and the up sampling filter $[u]$ is given by the following equation:

$$[u]_{16\times 21}=\begin{bmatrix} [g_2]_{13},0\ldots & \ldots 0 \\ 0,[g_1]_{13},0\ldots & \ldots 0 \\ 0,[g_2]_{13},0\ldots & \ldots 0 \\ & \\ 0\ldots & \ldots 0,[g_1]_{13},0 \\ 0\ldots & \ldots 0,[g_2]_{13},0 \\ 0\ldots & \ldots 0,[g_1]_{13} \end{bmatrix}_{16\times 21} \tag{74}$$

A subsequent prediction down sampling operation is then needed to produce the final desired down sampled field prediction $[\hat{x}']_{4\times 1}$. This down sampling, which is described below, depends on vmvtype and whether vmv is even or odd valued.

vmvtype=0

For the case where the vertical motion vector vmv is even valued, the desired down sampled prediction is given by the convolution of $[f]_8$ with $[\hat{x}]_{16\times 1}$ in accordance with the following equation:

$$[d_0][\hat{x}]_{16\times 1}=[\hat{x}']_{4\times 1} \tag{75}$$

where $[\hat{x}]_{16\times 1}$ are the up sampled pixels to be down sampled, where $[\hat{x}']_{4\times 1}$ are the resulting down sampled pixels, and where $[d_0]$ is the down sampling filter given by the following equation:

$$[d_0]_{4\times 16}=\begin{bmatrix} [f]_8 & 0 & 0 & 0 & 0 & 0 & 0 & 0 & 0 \\ 0 & 0 & [f]_8 & 0 & 0 & 0 & 0 & 0 & 0 \\ 0 & 0 & 0 & 0 & [f]_8 & 0 & 0 & 0 & 0 \\ 0 & 0 & 0 & 0 & 0 & 0 & [f]_8 & 0 & 0 \end{bmatrix}_{4\times 16} \tag{76}$$

The vertical prediction up sample and down sample filtering can be combined into a single operation given by the following equation:

$$[PL_{0-ev}][x']_{21\times 1}=[\hat{x}']_{4\times 1} \tag{77}$$

where the combined up sampling and down sampling filter $[PL_{0-ev}]$ is given by the following equation:

$$[d_0][u]=[PL_{0-ev}]_{4\times 21} \tag{78}$$

For the case where the vertical motion vector vmv is odd valued, up sampling must be followed by ½ pixel linear interpolation given by the following equation:

$$[LI][\hat{x}]_{16\times 1}=[\hat{x}_i]_{16\times 1} \tag{79}$$

where $[\hat{x}]_{16\times 1}$ are the up sampled pixels to be linearly interpolated, where $[\hat{x}_i]_{16\times 1}$ are the resulting linearly interpolated pixels, and where the linear interpolation filter is given by the following equation:

$$[LI]_{16\times16} = \begin{bmatrix} 1/2 & 1/2 & 0\ldots & & \ldots 0 \\ 0 & 1/2 & 1/2 & 0\ldots & \ldots 0 \\ & & & & \\ & 0\ldots & & \ldots 0 & 1/2 & 1/2 \\ & 0\ldots & & \ldots 0 & & \end{bmatrix}_{16\times16}$$ (80)

Down sampling is then performed in accordance with the following equation:

$$[d_0][\hat{x}_i]_{16\times1}=[\hat{x}']_{4\times1} \quad (81)$$

where $[\hat{x}_i]_{16\times1}$ are the up sampled and linearly interpolated pixels to be down sampled, where $[\hat{x}']_{4\times1}$ are the resulting down sampled pixels, and where $[d_0]$ is the down sampling filter given by equation (76).

This vertical up sampling, linear interpolation, and down sampling can be combined into a single operation given by the following equation:

$$[PL_{0-odd}][x']_{21\times1}=[\hat{x}_i']_{4\times1} \quad (82)$$

where the combined vertical up sampling, linear interpolation, and down sampling filter $[PL_{0-odd}]$ is given by the following equation:

$$[d_0][LI][u]=[PL_{0-odd}]_{4\times21} \quad (83)$$

vmvtype=1

For the case where the vertical motion vector vmv is even valued, the desired down sampled field prediction is given by the convolution of $[f]_8$ with $[\hat{x}]_{16\times1}$ in accordance with the following equation:

$$[d_1][\hat{x}]_{16\times1}=[\hat{x}']_{4\times1} \quad (84)$$

where the down sampling filter $[d_1]$ is given by the following equation:

$$[d_1]_{4\times16} = \begin{bmatrix} 0 & [f]_8 & 0 & 0 & 0 & 0 & 0 & 0 & 0 \\ 0 & 0 & 0 & [f]_8 & 0 & 0 & 0 & 0 & 0 \\ 0 & 0 & 0 & 0 & 0 & [f]_8 & 0 & 0 & 0 \\ 0 & 0 & 0 & 0 & 0 & 0 & 0 & [f]_8 & 0 \end{bmatrix}_{4\times16}$$ (85)

The vertical prediction up sample and down sample filtering can be combined into a single operation given by the following equation:

$$[PL_{1-ev}][x']_{21\times1}=[\hat{x}]_{4\times1} \quad (86)$$

where the combined up sampling and down sampling filter $[PL_{1-ev}]$ is given by the following equation:

$$[d_1][u]=[PL_{1-ev}]_{4\times21} \quad (87)$$

For the case where the vertical motion vector vmv is odd valued, up sampling must be followed by ½ pixel linear interpolation given by the following equation:

$$[LI]_{16\times16}[\hat{x}_i]_{16\times1}=[\hat{x}_i]_{16\times1} \quad (88)$$

where the linear interpolation filter is given by equation (80). Then, down sampling can be performed in accordance with the following equation:

$$[d_1][\hat{x}_i]_{16\times1}=[\hat{x}']_{4\times1} \quad (89)$$

Vertical up sampling, linear interpolation, and down sampling can be combined into a single operation given by the following equation:

$$[PL_{1-odd}][x']_{21\times1}=[\hat{x}_i']_{4\times1} \quad (90)$$

where the combined vertical up sampling, linear interpolation, and down sampling filter $[PL_{1-odd}]$ is given by the following equation:

$$[d_1][LI][u]=[PL_{1-odd}]_{4\times21} \quad (91)$$

IIB3.—Frame Prediction for Frame Pictures

Figure 9:
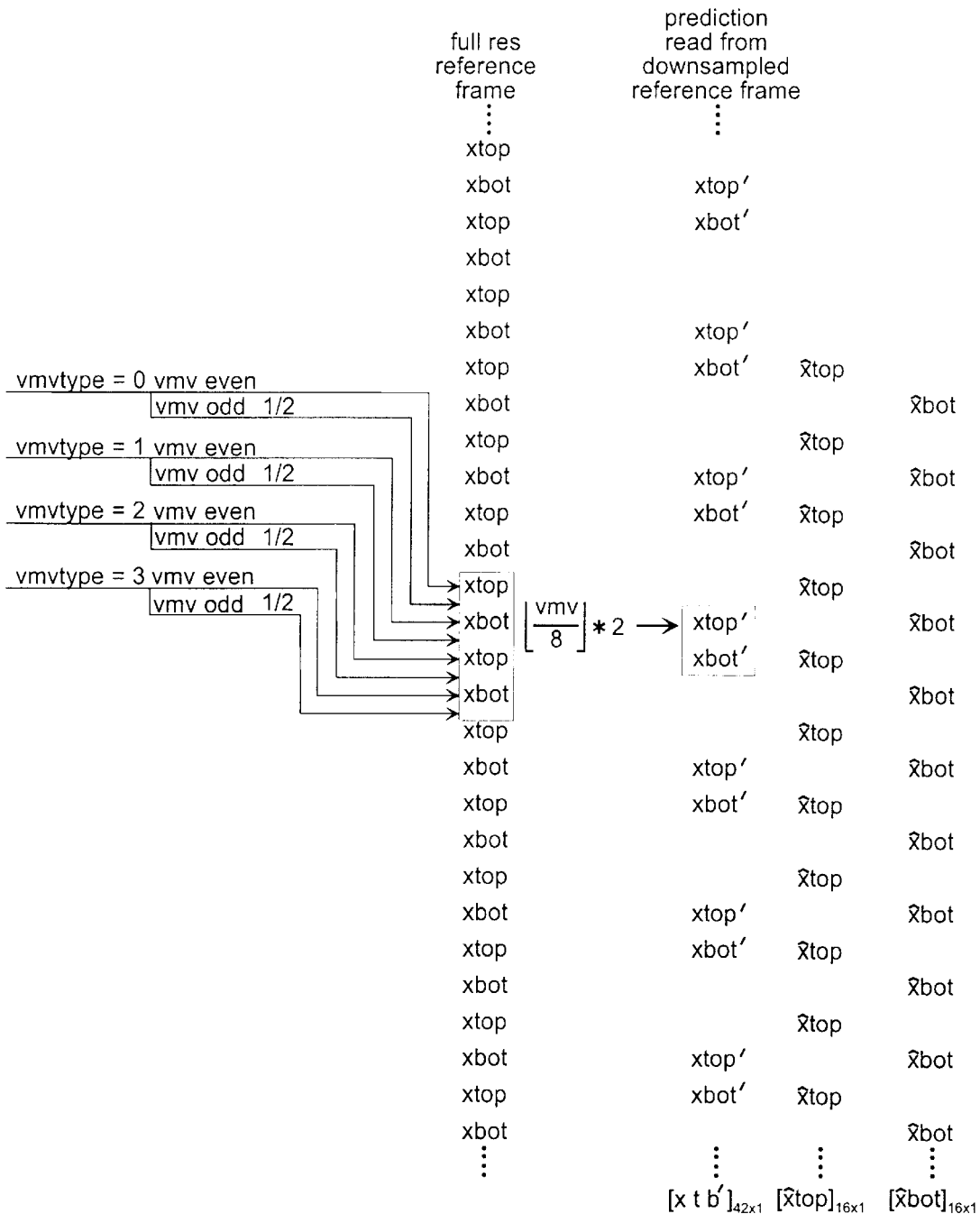

For the case of frame prediction, two field predictions must be derived to match the residual values which have been converted by the filtering and down sampling module 102 from a frame DCT coded macroblock to a field DCT coded macroblock. As shown in FIG. 9, the first column represents a portion of a vertical column of pixels from a full resolution reference frame 16 in the encoder 10 of FIG. 1. The second column represents the corresponding portion of a column of pixels $[xtb']_{42\times1}$ from that frame in the down sampled reference from the memory 106 of the decoder loop. The full resolution motion vector (vmv) for a desired frame prediction points to the indicated pixel in the first column. This motion vector is in units of ½ pixel. If vmv is odd valued, it points between pixels at full resolution.

The input to the prediction filter of the motion compensator 104 is the group of forty-two vertical pixels [xtb'] in the second column. To correctly access the group of forty-two vertical pixels, the vertical component of the full resolution motion vector is modified according to the following equation:

$$lvmv = 2\left\lfloor \frac{vmv}{8} \right\rfloor \quad (92)$$

This low resolution vertical motion vector lvmv will point to a top field pixel (xtop') in the down sampled reference frame. The input to the prediction filter must include the sixteen pixels above it and the twenty-five pixels below it.

The vertical motion vector vmv can be classified into one of four types based on a value vmvtype, each having a different spatial relationship to the down sampled reference frame as shown in FIG. 9. These classifications are given by the following equation;

$$vmvtype = \left\lfloor \frac{vmv \% 8}{2} \right\rfloor \quad (93)$$

where vmvtype can have values of 0, 1, 2, or 3 according to equation (93). From the definitions of $[g_1]_{13}$ and $[g_2]_{13}$ in equations (53) and (54), respectively, two twenty-five tap filters may be defined in accordance with the following equations:

$$[gx_1]_{25}=[g_1(0)\ 0\ g_1(1)\ 0\ g_1(2)\ 0 \ldots g_1(12)] \quad (94)$$

$$[gx_2]_{25}=[g_2(0)\ 0\ g_2(1)\ 0\ g_2(2)\ 0 \ldots g_2(12)] \quad (95)$$

The up sampling filter [u] is then given by the following equation:

$$[u]_{32\times42} = \qquad (96)$$

$$\begin{bmatrix} \begin{bmatrix} [gx_2],0,0,0\ldots & \ldots 0 \\ 0,0,[gx_1],0\ldots & \ldots 0 \\ 0,0,[gx_2],0\ldots & \ldots 0 \\ & \\ 0\ldots & \ldots 0,[gx_1],0,0,0 \\ 0\ldots & \ldots 0,[gx_2],0,0,0 \\ 0\ldots & \ldots 0,0,0,[gx_1],0 \end{bmatrix}_{16\times42} \\ \begin{bmatrix} 0,[gx_2],0,0,0\ldots & \ldots 0 \\ 0,0,0,[gx_1],0\ldots & \ldots 0 \\ 0,0,0,[gx_2],0\ldots & \ldots 0 \\ & \\ 0\ldots & \ldots 0,[gx_1],0,0 \\ 0\ldots & \ldots 0,[gx_2],0,0 \\ 0\ldots & \ldots 0,0,0,[gx_1] \end{bmatrix}_{16\times42} \end{bmatrix}_{32\times42} = \begin{bmatrix} [u_{top}] \\ [u_{bot}] \end{bmatrix}$$

Independently up sampling each field of $[xtb']_{42\times1}$ from the down sampled reference frame in FIG. 9 is performed in accordance with the following equation:

$$[u]_{32\times42}[xtb']_{42\times1} = \begin{bmatrix} [\hat{x}top]_{16\times1} \\ [\hat{x}bot]_{16\times1} \end{bmatrix}_{32\times1} \qquad (97)$$

Therefore, the up sampled prediction consists of $[\hat{x}top]_{16\times1}$ and $[\hat{x}bot]_{16\times1}$ which are the 3rd and 4th columns, respectively, in FIG. 9.

A subsequent prediction down sampling operation (on each up sampled field) is then required in order to produce the final desired pair of field predictions. The down sampling, described below, depends on vmvtype and whether vmv is even or odd valued.

vmvtype=0, vmv even valued

The down sample filter for each field prediction is given by the following equation:

$$[d_{0-top}]_{4\times16} = \qquad (98)$$
$$[d_{0-bot}]_{4\times16} = \begin{bmatrix} [f]_8 & 0 & 0 & 0 & 0 & 0 & 0 & 0 \\ 0 & 0 & [f]_8 & 0 & 0 & 0 & 0 & 0 \\ 0 & 0 & 0 & 0 & [f]_8 & 0 & 0 & 0 \\ 0 & 0 & 0 & 0 & 0 & 0 & [f]_8 & 0 & 0 \end{bmatrix}_{4\times16}$$

The down sampling filter $[d_0]_{8\times32}$ may then be defined according to the following equation:

$$[d_0]_{8\times32} = \begin{bmatrix} [d_{0-top}]_{4\times16} & 0 \\ 0 & [d_{0-bot}]_{4\times16} \end{bmatrix} \qquad (99)$$

Independently down sampling each up sampled field results in the desired field predictions as given by the following equation:

$$[d_0]_{8\times32}\begin{bmatrix} [\hat{x}top]_{16\times1} \\ [\hat{x}bot]_{16\times1} \end{bmatrix}_{32\times1} = \begin{bmatrix} [\hat{x}top']_{4\times1} \\ [\hat{x}bot']_{4\times1} \end{bmatrix} \qquad (100)$$

A combined up sample-down sample filter is given by the following equation:

$$[PL_{0-ev}]_{8\times42} = [d_0]_{8\times32}[u]_{32\times42} \qquad (101)$$

This combined up sample-down sample filter may be used to produce the desired field predictions as given by the following equation:

$$[PL_{0-ev}]_{8\times42}[xtb']_{42\times1} = \begin{bmatrix} [\hat{x}top']_{4\times1} \\ [\hat{x}bot']_{4\times1} \end{bmatrix} \qquad (102)$$

vmvtype=0, vmv odd valued

As shown above, the independently up sampled field prediction is given by the following expression:

$$\begin{bmatrix} [\hat{x}top]_{16\times1} \\ [\hat{x}bot]_{16\times1} \end{bmatrix}_{32\times1} \qquad (103)$$

The separately up sampled fields must be shuffled and linearly interpolated. The shuffle/interp operator is given by the following equation:

$$[SLI]_{32\times32} = \qquad (104)$$

$$\begin{bmatrix} \begin{bmatrix} .5 & 0\ldots & & \ldots 0 \\ 0 & .5 & 0\ldots & \ldots 0 \\ 0\ldots & & \ldots 0 & .5 \end{bmatrix}_{16\times16} & \begin{bmatrix} .5 & 0\ldots & & \ldots 0 \\ 0 & .5 & 0\ldots & \ldots 0 \\ 0\ldots & & \ldots 0 & .5 \end{bmatrix}_{16\times16} \\ \begin{bmatrix} 0 & .5 & 0\ldots & \ldots 0 \\ 0 & 0 & .5 & 0\ldots & \ldots 0 \\ 0\ldots & & \ldots 0 & .5 \\ 0\ldots & & \ldots 0 \end{bmatrix}_{16\times16} & \begin{bmatrix} .5 & 0\ldots & & \ldots 0 \\ 0 & .5 & 0\ldots & \ldots 0 \\ 0\ldots & & \ldots 0 & .5 & 0 \\ 0\ldots & & \ldots 0 \end{bmatrix}_{16\times16} \end{bmatrix}_{32\times32}$$

The shuffling and linear interpolation performed on the up sampled fields is given by the following equation:

$$[SLI]_{32\times32}\begin{bmatrix} [\hat{x}top]_{16\times1} \\ [\hat{x}bot]_{16\times1} \end{bmatrix}_{32\times1} = \begin{bmatrix} [\hat{x}topi]_{16\times1} \\ [\hat{x}boti]_{16\times1} \end{bmatrix}_{32\times1} \qquad (106)$$

Independently down sampling each up sampled, shuffled, and linearly interpolated field results in the desired field predictions given by the following equation:

$$[d_0]_{8\times32}\begin{bmatrix}[\hat{x}topi]_{16\times1}\\ [\hat{x}boti]_{16\times1}\end{bmatrix}_{32\times1}=\begin{bmatrix}[\hat{x}topi']_{4\times1}\\ [\hat{x}boti']_{4\times1}\end{bmatrix}_{8\times1} \qquad (107)$$

where the down sampling filter $[d_0]_{8\times32}$ is given by equation (99).

The operations of the up sampling filter $[u]$, the shuffling and linearly interpolating filter $[SLI]$, and the down sampling filter $[d_0]$ may be combined according to the following equation:

$$[PL_{0-odd}]_{8\times42}=[d_0]_{8\times32}[SLI]_{32\times32}[u]_{32\times42} \qquad (108)$$

and the desired field predictions are given by the following equation:

$$[PL_{0-odd}]_{8\times42}[xtb']_{42\times1}=\begin{bmatrix}[\hat{x}topi']_{4\times1}\\ [\hat{x}boti']_{4\times1}\end{bmatrix} \qquad (109)$$

vmvtype—1

The down sampler for each field prediction is given by the following two equations:

$$[d_{1-top}]_{4\times16}=\begin{bmatrix}0 & [f]_8 & 0 & 0 & 0 & 0 & 0 & 0 & 0\\ 0 & 0 & 0 & [f]_8 & 0 & 0 & 0 & 0 & 0\\ 0 & 0 & 0 & 0 & 0 & [f]_8 & 0 & 0 & 0\\ 0 & 0 & 0 & 0 & 0 & 0 & 0 & [f]_8 & 0\end{bmatrix}_{4\times16} \qquad (110)$$

$$[d_{1-bot}]_{4\times16}=\begin{bmatrix}[f]_8 & 0 & 0 & 0 & 0 & 0 & 0 & 0 & 0\\ 0 & 0 & [f]_8 & 0 & 0 & 0 & 0 & 0 & 0\\ 0 & 0 & 0 & 0 & [f]_8 & 0 & 0 & 0 & 0\\ 0 & 0 & 0 & 0 & 0 & 0 & [f]_8 & 0 & 0\end{bmatrix}_{4\times16} \qquad (111)$$

which may be combined into a single operator as given by the following equation:

$$[d_1]_{8\times32}=\begin{bmatrix}[d_{1-top}]_{4\times16} & 0\\ 0 & [d_{1-bot}]_{4\times16}\end{bmatrix} \qquad (112)$$

Using this combined down sampling filter $[d_1]$, combined filters $[PL_{1-ev}]_{8\times42}$ and $[PL_{1-odd}]_{8\times42}$ may be derived in a manner similar to the derivation of $[PL_{0-ev}]$ and $[PL_{0-odd}]$ (shown in equations (101) and (108)), and may be used in accordance with the following equation in order to produce the desired field prediction for the vmv even valued case:

$$[PL_{1-ev}]_{8\times42}[xtb']_{42\times1}=\begin{bmatrix}[\hat{x}top']_{4\times1}\\ [\hat{x}bot']_{4\times1}\end{bmatrix} \qquad (113)$$

and for the vmv odd valued case:

$$[PL_{1-odd}]_{8\times42}[xtb']_{42\times1}=\begin{bmatrix}[\hat{x}topi']_{4\times1}\\ [\hat{x}boti']_{4\times1}\end{bmatrix}. \qquad (114)$$

vmvtype=2

The down sampling filter for each field prediction is given by the following equation:

$$[d_{2-top}]_{4\times16}= \qquad (115)$$

-continued $$[d_{2-bot}]_{4\times16}=\begin{bmatrix}0 & [f]_8 & 0 & 0 & 0 & 0 & 0 & 0 & 0\\ 0 & 0 & 0 & [f]_8 & 0 & 0 & 0 & 0 & 0\\ 0 & 0 & 0 & 0 & 0 & [f]_8 & 0 & 0 & 0\\ 0 & 0 & 0 & 0 & 0 & 0 & 0 & [f]_8 & 0\end{bmatrix}_{4\times16}$$

which can be combined according to the following equation:

$$[d_2]_{8\times32}=\begin{bmatrix}[d_{2-top}]_{4\times16} & 0\\ 0 & [d_{2-bot}]_{4\times16}\end{bmatrix} \qquad (116)$$

Using the down sampling filter of equation (116) in the same manner as the derivations for vmvtype=0 and 1, the combined filters $[PL_{2-ev}]_{8\times42}$ and $[PL_{2-odd}]_{8\times42}$ can be derived and can be used according to the following equations in order to produce the desired field prediction for the vmv even valued case:

$$[PL_{2-ev}]_{8\times42}[xtb']_{42\times1}=\begin{bmatrix}[\hat{x}top']_{4\times1}\\ [\hat{x}bot']_{4\times1}\end{bmatrix} \qquad (117)$$

and for the vmv odd valued case:

$$[PL_{2-odd}]_{8\times42}[xtb']_{42\times1}=\begin{bmatrix}[\hat{x}topi']_{4\times1}\\ [\hat{x}boti']_{4\times1}\end{bmatrix}. \qquad (118)$$

vmvtype=3

The down sampler for each field prediction is given by the following two equations:

$$[d_{3-top}]_{4\times16}=\begin{bmatrix}0 & 0 & [f]_8 & 0 & 0 & 0 & 0 & 0 & 0\\ 0 & 0 & 0 & 0 & [f]_8 & 0 & 0 & 0 & 0\\ 0 & 0 & 0 & 0 & 0 & 0 & [f]_8 & 0 & 0\\ 0 & 0 & 0 & 0 & 0 & 0 & 0 & 0 & [f]_8\end{bmatrix}_{4\times16} \qquad (119)$$

$$[d_{3-bot}]_{4\times16}=\begin{bmatrix}0 & [f]_8 & 0 & 0 & 0 & 0 & 0 & 0 & 0\\ 0 & 0 & 0 & [f]_8 & 0 & 0 & 0 & 0 & 0\\ 0 & 0 & 0 & 0 & 0 & [f]_8 & 0 & 0 & 0\\ 0 & 0 & 0 & 0 & 0 & 0 & 0 & [f]_8 & 0\end{bmatrix}_{4\times16} \qquad (120)$$

These two down sampling filters can be combined according to the following equation:

$$[d_3]_{8\times32}=\begin{bmatrix}[d_{3-top}]_{4\times16} & 0\\ 0 & [d_{3-bot}]_{4\times16}\end{bmatrix} \qquad (121)$$

Using the down sampling filter of equation (121) in the same manner as the derivations for vmvtype=0, 1, and 2, the combined filters $[PL_{3-ev}]_{8\times42}$ and $[PL_{3-odd}]_{8\times42}$ can be derived and can be used according to the following equations in order to produce the desired field prediction for the vmv even valued case:

$$[PL_{3-ev}]_{8\times42}[xtb']_{42\times1}=\begin{bmatrix}[\hat{x}top']_{4\times1}\\ [\hat{x}bot']_{4\times1}\end{bmatrix} \qquad (122)$$

and for the vmv odd valued case:

$$[PL_{3-odd}]_{8\times42}[xtb']_{42\times1} = \begin{bmatrix} [\hat{x}topi']_{4\times1} \\ [\hat{x}boti']_{4\times1} \end{bmatrix}. \quad (123)$$

IIC.—Summary of Derived Vertical Prediction Filter Operators

IIC1.—Field Prediction for Field Pictures

The following operators from equations (62), (66), (70), and (72) are used for field prediction of field pictures and are 8×25 matrices:

$$[PL_{0-ev}], [PL_{0-odd}], [PL_{1-ev}], [PL_{1-odd}]$$

IIC2.—Field Prediction for Frame Pictures

The following operators from equations (78), (83), (87), and (91) are used for field prediction of frame pictures and are 4×21 matrices, with two predictions required per macroblock:

$$[PL_{0-ev}], [PL_{0-odd}], [PL_{1-ev}], [PL_{1-odd}]$$

IIC3.—Frame Prediction for Frame Pictures

The following operators from equations (101), (108), and similar equations are used for frame prediction of frame field pictures and are 8×42 matrices:

$$[PL_{0-ev}], [PL_{0-odd}]$$

$$[PL_{1-ev}], [PL_{1-odd}]$$

$$[PL_{2-ev}], [PL_{2-odd}]$$

$$[PL_{3-ev}], [PL_{3-odd}]$$

IID.—Motion Compensator Block Diagram (FIG. 5, Module 104)

The motion compensator 104 is shown in more detail in FIG. 10. A motion vector translator 150 translates the received full resolution motion vector into a low resolution motion vector as previously described. This low resolution motion vector is then converted into reference picture memory addresses for supply to the memory 106. Vertically, this translation and conversion depends on the prediction type (frame or field) as described in the preceding discussion. The reference pixels read from the memory 106 by the addresses from the motion vector translator 150 are supplied to a horizontal prediction filter 152. Horizontal prediction filtering occurs in the horizontal prediction filter 152 and is the same as previously described in connection with the minimum drift prediction for a four point IDCT.

The results of the horizontal prediction filtering are supplied to a vertical prediction filter 154. Vertical prediction filtering (up sampling and down sampling) is performed by the vertical prediction filter 154 depending upon the prediction type and vmv value (odd or even) as described above. Thus, depending on prediction type and vmv value (odd or even), the correct vertical filter operator [PL] is read from a memory 156 and is applied to each column of pixels as they are received from the horizontal prediction filter 152. The horizontally and vertically filtered prediction is supplied by the vertical prediction filter 154 to an adder 108 (FIG. 5) to be added to the incoming residual macroblock from the filtering and down sampling module 102.

The spatial effect of the vertical down sampling method implemented by the filtering and down sampling module 102 of FIG. 5 must be considered. FIG. 11 shows the effective spatial relationship between the original full resolution pixels of an interlaced picture (pixels A for the top field and pixels B for the bottom field as shown by the first column of FIG. 11) and those of the corresponding down sampled interlaced picture (pixels "a" for the top field and pixels "b" for bottom field as shown by the second column of FIG. 11). It is noted that the derived "a" pixels fall half way between every other pair of A pixels, and the derived "b" pixels fall half way between every other pair of B pixels. It is also noted that, in the original full resolution picture, the B pixels fall half way between the A pixels. However, it can be seen that, in the resulting down sampled picture, the "b" pixels do not fall half way between the "a" pixels.

Therefore, an interpolator 110 of FIG. 5 contains vertical filters to effectively adjust the vertical positions of the "a" and "b" fields so that the "b" pixels fall midway between the "a" pixels as shown in FIG. 12. One exemplary vertical filter consists of a simple linear interpolator that shifts the "a" field up by ⅛ sample position and the "b" field down by ⅛ sample position. Filters more complicated than linear interpolators may also be used.

It is also possible to eliminate the need for the interpolator 110 of FIG. 5 by modifying the filtering and down sampling module 102 of FIG. 5 in order to achieve the above described ⅛ sample shifts for each of the fields. In this case, two different filters would be needed as replacements for $f_8$ of equation (1), one for the A or top field and one for the B or bottom field. A down sampling filter for the A field filter given by the following equation would be derived similarly to that of equation (1) but would include an ⅛ sample shift:

$$[f_A]=[-0.0104\ -0.0057\ 0.1615\ 0.4130\ 0.3645\ 0.0973\ -0.0156\ -0.0046] \quad (124)$$

Similarly, a down sampling filter for the B field given by the following equation would include an ⅛ sample shift in the opposite direction:

$$[f_B]=[-0.0046\ -0.0156\ 0.0973\ 0.3645\ 0.4130\ 0.1615\ -0.0057\ -0.0104] \quad (125)$$

Respective matching prediction filters would have to be derived for each of the fields in a manner exactly as previously described.

IIE.—Drift Reduction for The Case of ½ Pixel Resolution Motion Vectors

IIE1.—½ Pixel Interpolation in One Direction

As previously mentioned, motion vectors for MPEG-2 encoded video have ½ pixel resolution. This ½ pixel resolution means that, when a vertical or horizontal motion vector is odd valued, ½ pixel interpolation is required when forming a prediction from a full resolution reference or an up sampled reduced resolution reference, as is the case for the down converting decoder 100 of FIG. 5. The MPEG-2 standard specifies that the ½ pixel interpolation for the case of either an odd valued horizontal motion vector or an odd valued vertical motion vector be calculated according to the following equation:

$$\left\lfloor \frac{x+y}{2} + 0.5 \right\rfloor \quad (126)$$

where x and y are integers (assumed to be 8 bits) representing the values of full resolution reference pixels.

This equation shows how to handle the least significant bit (LSB) of the calculated interpolated pixel. If x+y=S, and if S is even, the above operation is exactly equivalent to S/2. But if S is odd, then S/2=I.5, where I is an integer, and equation (126) will effectively cause a round up to I+1. This increase from I.5 to I+1 is equivalent to an increase of ½

LSB. Assuming that on average, half the time S is even and half the time S is odd, equation (126) requires an average increase of ¼ LSB in the calculated interpolated prediction pixel. A decoder that linearly combines the calculation of S/2 with other filtering operations (like the single step matrix operator of equation (66) executed by the vertical prediction filter 154 of FIG. 10) and that then rounds the result will effectively retain the fractional part of S (S=I.5 50% of the time instead of the desired I+1) until final rounding. Such a decoder, therefore, exhibits a DC prediction drift towards a darker picture until the next I frame.

Therefore, to more closely meet the requirements of equation (126) for operations such as that of equation (65) when the motion vector is odd valued, the prediction output from the vertical prediction filter 154 of FIG. 10 should be modified by adding 0.25 (equivalent to ¼ LSB) to its output and then rounding the prediction result to an 8 bit integer before it is provided to the adder 108 of FIG. 5.

IIE2.—½ Pixel Interpolation in Both Directions

When both the horizontal and the vertical motion vectors are odd valued, the standard specifies a four way interpolation given by the following equation:

$$\left\lfloor \frac{a+b+c+d}{4} + 0.5 \right\rfloor \quad (127)$$

Equation (127) shows how to handle the LSB of the calculated interpolated pixel. If a+b+c+d=S, and if S is evenly divisible by four (case 1), the above operation is exactly equivalent to S/4. Otherwise, there are three other cases to consider (% denotes the modulo operation). In case 2, (S/4)%4=1, so that S/4=I.25. Equation (127) will reduce S/4 by 0.25 (−¼ LSB) . In case 3, (S/4)%4=2, so that S/4=I.5. Equation (127) will increase S/4 by 0.5 (+½ LSB). In case 4, (S/4)%4=3, so that S/4=I.75. Equation (127) will increase S/4 by 0.25 (+¼ LSB).

Assuming all four cases are equally probable, then on average equation (127) requires an increase of (0−0.25+0.5+0.25)/4=⅛ LSB in the calculated interpolated prediction pixel. Therefore, for the case of both horizontal and vertical odd valued motion vectors, the prediction output of FIG. 10 should be modified by adding 0.125 (equivalent to ⅛ LSB) to the output of the vertical prediction filter 154 and then rounding the prediction result to an eight bit integer before it is provided to the adder 108 of FIG. 5.

III.—Extension to Other Down Sampling Ratios

It should be noted that, in the preceding section, both the horizontal and vertical down sampling have been effected by a factor of two. However, the method described is not so restricted, and may be extended to other down sampling ratios in a straightforward manner. For example, horizontal down sampling by utilizing a three point IDCT (instead of the above mentioned four point IDCT) results in horizontal down sampling by a factor of 8/3 and is well known in the art. The novel vertical methods described herein can be extended to down sampling by a factor, for example, of 8/5. A vertical filter f, similar to that of equation (1) may be used (perhaps one with somewhat less attenuation at higher frequencies). The down sampling process can be decomposed into an up sample by five filter, then down sampled by eight. (Rational valued down sampling is well known). A minimum drift prediction filter may be derived from the down sampling filter f as previously described.

Certain modifications of the present invention have been discussed above. Other modifications will occur to those practicing in the art of the present invention. For example, according to the description above, fourteen rows are used for performing a vertical IDCT during down conversion. However, any number of rows may instead be used.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of reducing drift in connection with an application of ½ pixel resolution motion vectors during prediction filtering comprising the following steps:

a) down converting received P and B frame and field DCT coded blocks;

b) selecting reference pixels based upon a received motion vector;

c) performing prediction filtering on the selected reference pixels to produce a prediction output;

d) if the motion vector is a ½ pixel resolution motion vector, adding a drift compensation value to the prediction output; and, e) adding the prediction output to the down converted P and B frame and field DCT coded blocks in order to form lower resolution reconstructed pixel blocks.

2. The method of claim 1 wherein the motion vector includes both a vertical motion vector and a horizontal motion vector, and wherein the drift compensation value is substantially 0.25 if one of the vertical and horizontal motion vectors is odd valued.

3. The method of claim 1 wherein the motion vector includes both a vertical motion vector and a horizontal motion vector, and wherein the drift compensation value is substantially 0.125 if both of the vertical and horizontal motion vectors are odd valued.

4. The method of claim 1 wherein the motion vector includes both a vertical motion vector and a horizontal motion vector, and wherein the drift compensation value is substantially 0.25 if one but not both of the vertical and horizontal motion vectors is odd valued.

5. The method of claim 1 wherein step d) comprises the step of adding no drift compensation to the prediction output if the motion vector is not a ½ pixel resolution motion vector.

6. The method of claim 1 wherein step a) comprises the following steps:

a1) converting the received P and B frame DCT coded blocks to converted P and B field DCT coded blocks; and, a2) down converting the received P and B field DCT coded blocks and the converted P and B field DCT coded blocks.

7. The method of claim 6 wherein the motion vector includes both a vertical motion vector and a horizontal motion vector, and wherein the drift compensation value is substantially 0.25 if one of the vertical and horizontal motion vectors is odd valued.

8. The method of claim 6 wherein the motion vector includes both a vertical motion vector and a horizontal motion vector, and wherein the drift compensation value is substantially 0.125 if both of the vertical and horizontal motion vectors are odd valued.

9. The method of claim 6 wherein the motion vector includes both a vertical motion vector and a horizontal motion vector, and wherein the drift compensation value is substantially 0.25 if one but not both of the vertical and horizontal motion vectors is odd valued.

10. The method of claim 6 wherein each of the received P and B frame and field DCT coded blocks contains N×N values, wherein step a2) comprises the step of performing a horizontal M point IDCT, a vertical N point IDCT, vertical spatial filtering, and down sampling on the received P and B field DCT coded blocks and the converted P and B field DCT coded blocks, wherein at least the vertical spatial filtering and down sampling encompasses more than N points, and wherein N>M.

11. The method of claim 10 wherein the motion vector includes both a vertical motion vector and a horizontal motion vector, and wherein the drift compensation value is substantially 0.25 if one of the vertical and horizontal motion vectors is odd valued.

12. The method of claim 10 wherein the motion vector includes both a vertical motion vector and a horizontal motion vector, and wherein the drift compensation value is substantially 0.125 if both of the vertical and horizontal motion vectors are odd valued.

13. The method of claim 10 wherein the motion vector includes both a vertical motion vector and a horizontal motion vector, and wherein the drift compensation value is substantially 0.25 if one but not both of the vertical and horizontal motion vectors is odd valued.

14. The method of claim 10 wherein N=8>M.

15. The method of claim 14 wherein M=4.

16. The method of claim 10 wherein the vertical spatial filtering and down sampling are combined as a single operator.

17. The method of claim 10 wherein the vertical IDCT, spatial filtering, and down sampling are combined as a single operator.

18. The method of claim 10 wherein step a1) comprises the step of applying an unshuffling operator to the received frame DCT coded blocks in order to convert the received frame DCT coded blocks to corresponding converted field DCT coded blocks.

19. A method of reconstructing pixel blocks from P and B DCT coded blocks comprising the following steps:
   a) selecting reference pixels from a memory in response to a motion vector;
   b) filtering the selected reference pixels to produce a filtered output;
   c) if the motion vector has ½ pixel resolution, adding a drift compensation value to the filtered output; and,
   d) adding the filtered output to the P and B DCT coded blocks in order to form the reconstructed pixel blocks.

20. The method of claim 19 wherein the motion vector includes both a vertical motion vector and a horizontal motion vector, and wherein the drift compensation value is substantially 0.25 if one of the vertical and horizontal motion vectors is odd valued.

21. The method of claim 19 wherein the motion vector includes both a vertical motion vector and a horizontal motion vector, and wherein the drift compensation value is substantially 0.125 if both of the vertical and horizontal motion vectors are odd valued.

22. The method of claim 19 wherein the motion vector includes both a vertical motion vector and a horizontal motion vector, and wherein the drift compensation value is substantially 0.25 if one but not both of the vertical and horizontal motion vectors is odd valued.

23. The method of claim 19 wherein step c) comprises the step of adding no drift compensation to the prediction output if the motion vector is not a ½ pixel resolution motion vector.

24. The method of claim 19 wherein the P and B DCT coded blocks are received P and B frame and field DCT coded blocks, and wherein step a) comprises the following steps:

a1) converting the received P and B frame DCT coded blocks to converted P and B field DCT coded blocks;
a2) down converting the received P and B field DCT coded blocks and the converted P and B field DCT coded blocks; and,
a3) selecting reference pixels from a memory in response to a motion vector.

25. The method of claim 24 wherein the motion vector includes both a vertical motion vector and a horizontal motion vector, and wherein the drift compensation value is substantially 0.25 if one of the vertical and horizontal motion vectors is odd valued.

26. The method of claim 24 wherein the motion vector includes both a vertical motion vector and a horizontal motion vector, and wherein the drift compensation value is substantially 0.125 if both of the vertical and horizontal motion vectors are odd valued.

27. The method of claim 24 wherein the motion vector includes both a vertical motion vector and a horizontal motion vector, and wherein the drift compensation value is substantially 0.25 if one but not both of the vertical and horizontal motion vectors is odd valued.

28. The method of claim 24 wherein each of the received P and B frame and field DCT coded blocks contains N×N values, wherein step a2) comprises the step of performing a horizontal M point IDCT, a vertical N point IDCT, vertical spatial filtering, and down sampling on the received P and B field DCT coded blocks and the converted P and B field DCT coded blocks, wherein at least the vertical spatial filtering and down sampling encompasses more than:N points, and wherein N>M.

29. The method of claim 28 wherein the motion vector includes both a vertical motion vector and a horizontal motion vector, and wherein the drift compensation value is substantially 0.25 if one of the vertical and horizontal motion vectors is odd valued.

30. The method of claim 28 wherein the motion vector includes both a vertical motion vector and a horizontal motion vector, and wherein the drift compensation value is substantially 0.125 if both of the vertical and horizontal motion vectors are odd valued.

31. The method of claim 28 wherein the motion vector includes both a vertical motion vector and a horizontal motion vector, and wherein the drift compensation value is substantially 0.25 if one but not both of the vertical and horizontal motion vectors is odd valued.

32. The method of claim 28 wherein N=8>M.

33. The method of claim 32 wherein M=4.

34. The method of claim 28 wherein the vertical spatial filtering and down sampling are combined as a single operator.

35. The method of claim 28 wherein the vertical IDCT, spatial filtering, and down sampling are combined as a single operator.

36. The method of claim 28 wherein step a1) comprises the step of applying an unshuffling operator to the received frame DCT coded blocks in order to convert the received frame DCT coded blocks to corresponding converted field DCT coded blocks.

37. A method of reconstructing pixel blocks from P and B DCT coded blocks comprising the following steps:
   a) selecting reference pixels from a memory in response to a motion vector;
   b) if the motion vector has ½ pixel resolution, adding drift compensation to the selected reference pixels; and,
   c) adding the selected reference pixels to the P and B DCT coded blocks in order to form the reconstructed pixel blocks.

38. The method of claim 37 wherein the motion vector includes both a vertical motion vector and a horizontal motion vector, and wherein the drift compensation is a value substantially equal to 0.25 if one of the vertical and horizontal motion vectors is odd valued.

39. The method of claim 37 wherein the motion vector includes both a vertical motion vector and a horizontal motion vector, and wherein the drift compensation is a value substantially equal to 0.125 if both of the vertical and horizontal motion vectors are odd valued.

40. The method of claim 37 wherein the motion vector includes both a vertical motion vector and-a horizontal motion vector, and wherein the drift compensation is a value substantially equal to 0.25 if one but not both of the vertical and horizontal motion vectors is odd valued.

41. The method of claim 37 wherein step b) comprises the step of adding no drift compensation to the selected reference pixels if the motion vector is not a ½ pixel resolution motion vector.

42. The method of claim 37 wherein the P and B DCT coded blocks are received P and B frame and field DCT coded blocks, and wherein step a) comprises the following steps:
   a1) converting the received P and B frame DCT coded blocks to converted P and B field DCT coded blocks;
   a2) down converting the received P and B field DCT coded blocks and the converted P and B field DCT coded blocks; and,
   a3) selecting reference pixels from a memory in response to a motion vector.

43. The method of claim 42 wherein the motion vector includes both a vertical motion vector and a horizontal motion vector, and wherein the drift compensation is a value substantially equal to 0.25 if one of the vertical and horizontal motion vectors is odd valued.

44. The method of claim 42 wherein the motion vector includes both a vertical motion vector and a horizontal motion vector, and wherein the drift compensation is a value substantially equal to 0.125 if both of the vertical and horizontal motion vectors are odd valued.

45. The method of claim 42 wherein the motion vector includes both a vertical motion vector and a horizontal motion vector, and wherein the drift compensation is a value substantially equal to 0.25 if one but not both of the vertical and horizontal motion vectors is odd valued.

46. The method of claim 42 wherein each of the received P and B frame and field DCT coded blocks contains N×N values, wherein step a2) comprises the step of performing a horizontal M point IDCT, a vertical N point IDCT, vertical spatial filtering, and down sampling on the received P and B field DCT coded blocks and the converted P and B field DCT coded blocks, wherein at least the vertical spatial filtering and down sampling encompasses more than N points, and wherein N>M.

47. The method of claim 46 wherein the motion vector includes both a vertical motion vector and a horizontal motion vector, and wherein the drift compensation is a value substantially equal to 0.25 if one of the vertical and horizontal motion vectors is odd valued.

48. The method of claim 46 wherein the motion vector includes both a vertical motion vector and a horizontal motion vector, and wherein the drift compensation is a value substantially equal to 0.125 if both of the vertical and horizontal motion vectors are odd valued.

49. The method of claim 46 wherein the motion vector includes both a vertical motion vector and a horizontal motion vector, and wherein the drift compensation is a value substantially equal to 0.25 if one but not both of the vertical and horizontal motion vectors is odd valued.

* * * * *